US008504427B2

(12) United States Patent
Quinlan et al.

(10) Patent No.: US 8,504,427 B2
(45) Date of Patent: Aug. 6, 2013

(54) MULTI-LINGUAL TWO-SIDED PRINTING

(75) Inventors: Mark D. Quinlan, Dayton, OH (US); Charles Q. Maney, Dayton, OH (US)

(73) Assignee: NCR Corporation, Duluth, GA (US)

( * ) Notice: Subject to any disclaimer, the term of this patent is extended or adjusted under 35 U.S.C. 154(b) by 1109 days.

(21) Appl. No.: 11/864,020

(22) Filed: Sep. 28, 2007

(65) Prior Publication Data

US 2009/0089172 A1    Apr. 2, 2009

(51) Int. Cl.
*G06Q 20/00*  (2006.01)

(52) U.S. Cl.
USPC ............. 705/17; 428/200; 428/480; 428/212; 428/913; 428/32; 428/64; 428/219; 428/340; 400/120; 400/320; 400/578; 400/74; 430/138; 430/157; 430/338; 430/141; 503/375; 503/383; 503/386; 503/381

(58) Field of Classification Search
USPC .......................................................... 705/17
See application file for complete search history.

(56) References Cited

U.S. PATENT DOCUMENTS

| 3,947,854 | A | 3/1976 | Hansen et al. |
| 4,167,392 | A | 9/1979 | Defago |
| RE30,116 | E | 10/1979 | Maalouf |
| 4,309,255 | A | 1/1982 | Gendler et al. |
| 4,507,669 | A | 3/1985 | Sakamoto et al. |
| 4,708,500 | A | 11/1987 | Bangs et al. |
| 4,956,251 | A | 9/1990 | Washizu et al. |
| 4,965,166 | A | 10/1990 | Hosoi et al. |
| 5,055,373 | A | 10/1991 | Saeki et al. |
| 5,101,222 | A | 3/1992 | Hakkaku |
| 5,132,704 | A | 7/1992 | Nakagawa |

(Continued)

FOREIGN PATENT DOCUMENTS

| EP | 0947340 | 10/1999 |
| GB | 2250478 | 6/1992 |
| WO | WO 2004/077001 A1 | 9/2004 |

OTHER PUBLICATIONS

Print '97: U.S. plays host to digital imaging and other technologies. (McCormick Place, Chicago, Sep. 3-10) (includes related article on new technology and products in large-format printing) (Industry Trend or Event) Seybold Report on Publishing Systems, vol. 26, No. 1, p. 3(30), Sep. 1, 1997.*

(Continued)

*Primary Examiner* — F. Zeender
*Assistant Examiner* — Fawaad Haider
(74) *Attorney, Agent, or Firm* — Charles Q. Maney; Michael Chan

(57) ABSTRACT

Methods of, and systems for, multi-lingual two-sided printing are provided. According to one embodiment, a method of multi-lingual two-sided printing is provided, the method comprising: initiating a transaction; identifying a first language for printing on a first side of two-sided media and a second language for printing on a second side of the two-sided media based on one or more aspects of the transaction; printing information on the first side of the two-sided media in the first language; and printing information on the second side of the two-sided media in the second language, wherein the first language is different from the second language. Variations including the printing of transaction information on a first side of two-side media and additional information on a second side of the two-sided media when an identified first language is not different from an identified second language are also disclosed.

28 Claims, 11 Drawing Sheets

U.S. PATENT DOCUMENTS

| | | | |
|---|---|---|---|
| 5,196,297 A | 3/1993 | Dombrowski, Jr. et al. | |
| 5,214,750 A | 5/1993 | Minowa et al. | |
| 5,266,550 A | 11/1993 | Asajima et al. | |
| 5,284,816 A | 2/1994 | Stephenson | |
| 5,351,995 A * | 10/1994 | Booker | 283/117 |
| 5,398,305 A | 3/1995 | Yawata et al. | |
| 5,428,714 A | 6/1995 | Yawata et al. | |
| 5,437,004 A | 7/1995 | Miyasaka et al. | |
| 5,555,349 A | 9/1996 | Miyasaka et al. | |
| 5,584,590 A | 12/1996 | Ito et al. | |
| 5,594,653 A | 1/1997 | Akiyama et al. | |
| 5,629,259 A | 5/1997 | Akada et al. | |
| 5,639,169 A | 6/1997 | Aruga | |
| 5,667,303 A | 9/1997 | Arens et al. | |
| 5,677,722 A | 10/1997 | Park | |
| 5,692,110 A | 11/1997 | Miyasaka et al. | |
| 5,707,925 A | 1/1998 | Akada et al. | |
| 5,710,094 A | 1/1998 | Minami et al. | |
| 5,755,521 A | 5/1998 | Ito et al. | |
| 5,756,188 A | 5/1998 | Reiter et al. | |
| 5,763,356 A | 6/1998 | Ueno et al. | |
| 5,789,340 A | 8/1998 | Brust et al. | |
| 5,792,725 A | 8/1998 | Simpson et al. | |
| 5,794,530 A | 8/1998 | Dobashi et al. | |
| 5,800,081 A | 9/1998 | Teradaira et al. | |
| 5,815,191 A | 9/1998 | Michielsen et al. | |
| 5,846,900 A | 12/1998 | Reiter et al. | |
| 5,876,836 A | 3/1999 | Imamura et al. | |
| 5,883,043 A | 3/1999 | Halbrook, Jr. et al. | |
| 5,886,725 A | 3/1999 | Miyadera et al. | |
| 5,918,910 A | 7/1999 | Stillwagon et al. | |
| 5,933,584 A * | 8/1999 | Maniwa | 358/1.15 |
| 5,964,541 A | 10/1999 | Murison et al. | |
| 6,095,414 A | 8/2000 | Long et al. | |
| 6,130,185 A | 10/2000 | Narita et al. | |
| 6,150,067 A | 11/2000 | Koike et al. | |
| 6,210,777 B1 | 4/2001 | Vermeulen et al. | |
| 6,388,692 B1 | 5/2002 | Iwata et al. | |
| 6,524,000 B1 | 2/2003 | Roth | |
| 6,544,925 B1 | 4/2003 | Prusik et al. | |
| 6,562,755 B1 | 5/2003 | Halbrook, Jr. et al. | |
| 6,759,366 B2 | 7/2004 | Beckerdite et al. | |
| 6,784,906 B2 | 8/2004 | Long et al. | |
| 6,801,233 B2 | 10/2004 | Bhatt et al. | |
| 6,906,735 B2 | 6/2005 | Bhatt et al. | |
| 2003/0047605 A1 * | 3/2003 | McClure et al. | 235/386 |
| 2003/0102370 A1 * | 6/2003 | Lapstun et al. | 235/380 |
| 2004/0084631 A1 | 5/2004 | Spoonhower et al. | |
| 2005/0020387 A1 | 1/2005 | Kennedy, III | |
| 2005/0164881 A1 | 7/2005 | Kenney et al. | |
| 2006/0289633 A1 | 12/2006 | Moreland et al. | |
| 2008/0316534 A1 * | 12/2008 | McGarry et al. | 358/1.18 |

OTHER PUBLICATIONS

JP Abstract, vol. 007, No. 063 (M-200), Mar. 16, 1983 & JP 57-208298 A (Ricoh KK), Dec. 21, 1982.

JP Abstract, vol. 007, No. 081 (M-105), Apr. 5, 1983 & JP 58-008668 A (Shinko Denki KK), Jan. 18, 1983.

JP Abstract, vol. 015, No. 194 (M-1114), May 20, 1991 & JP 03-051149 A (Fujitsu General Ltd.), Mar. 5, 1991.

JP Abstract, vol. 2000, No. 24 May 11, 2001 & JP 2001-199095 A (Alps Electric Co. Ltd.), Jul. 24, 2001.

JP Abstract, vol. 1998, No. 08, Jun. 30, 1998 & JP 10-076713 A (Sony Corp.) Mar. 24, 1998.

JP Abstract, vol. 010, No. 151 (M-483), May 31, 1986 & JP 61-003765 A (Konishiroku Shashin Kogyo KK), Jan. 9, 1986.

JP Abstract, vol. 016, No. 041 (M-1206), Jan. 31, 1992 & JP 03-246091 A (Canon Inc.), Nov. 1, 1991.

Boca Systems Micro Plus 2S 2 Sided Printer product brochure which came to the attention of Applicant at a Chicago tradeshow during the summer of 2002.

APTi PowerEcoT R2412 printer brochure, which was came to the attention of Applicant in the summer of 2007, and was translated by Applicant's Japanese Office in the fall of 2007.

* cited by examiner

FIG. 2A

Our Store
Any Town
Today

| | |
|---|---|
| Coffee | $1.29 |
| Carrots | $0.50 |
| Oranges | $3.23 |
| Kiwi | $1.23 |
| Apples | $1.79 |
| Ham | $4.23 |
| Bread | $2.31 |
| Beef | $5.34 |
| Custard | $1.31 |
| Milk | $2.91 |
| Total | $22.35 |

FIG. 2B

Nuestro Almacén
Caulquier Ciudad
Hoy

| | |
|---|---|
| Café | 1.79 € |
| Zanahorias | 0.69 € |
| Naranjas | 4.48 € |
| Kiwi | 1.71 € |
| Manzanas | 2.48 € |
| Jamón | 5.87 € |
| Pan | 3.20 € |
| Carne de vaca | 7.41 € |
| Torilas | 1.82 € |
| Leche | 4.04 € |
| Total | 31.01 € |

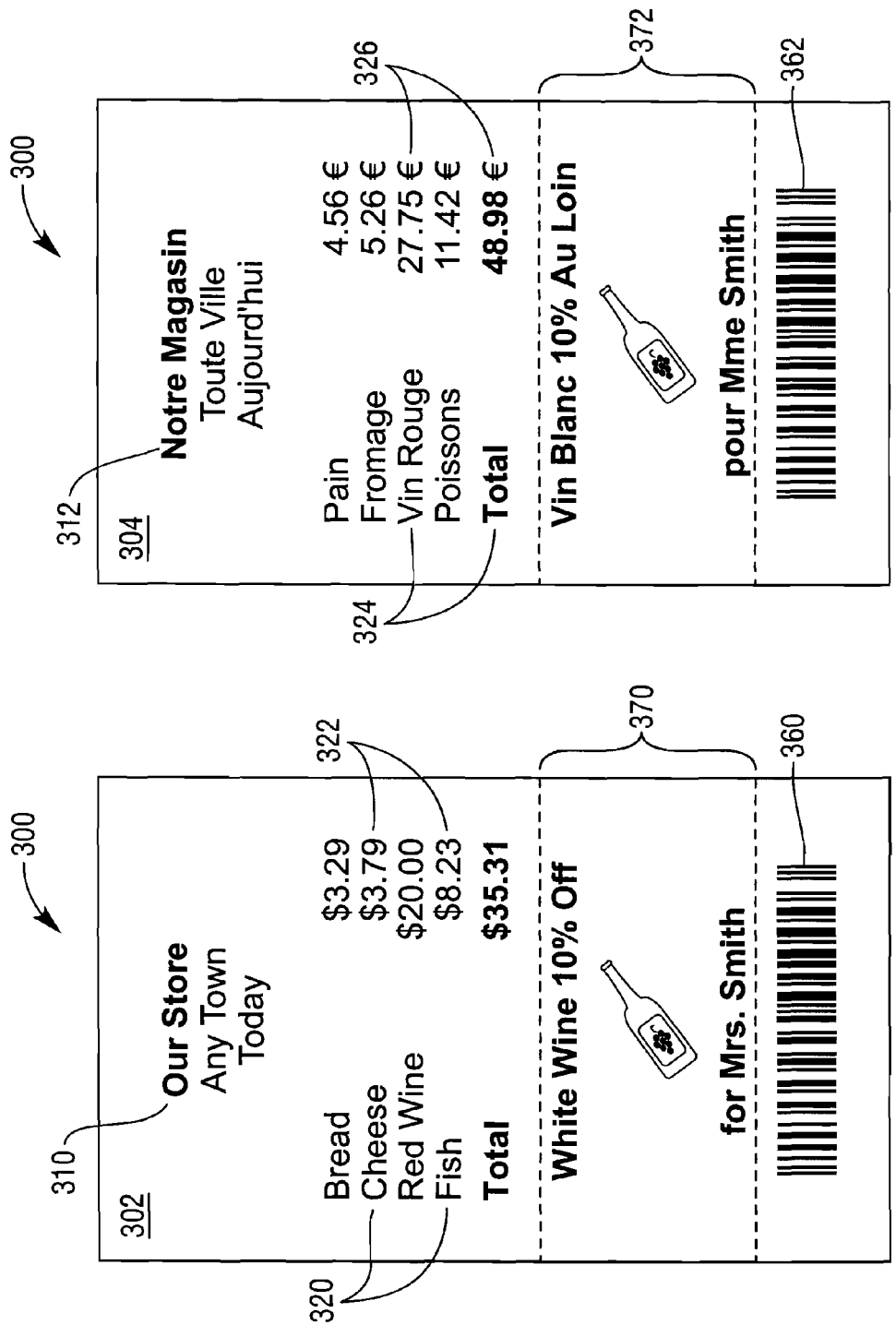

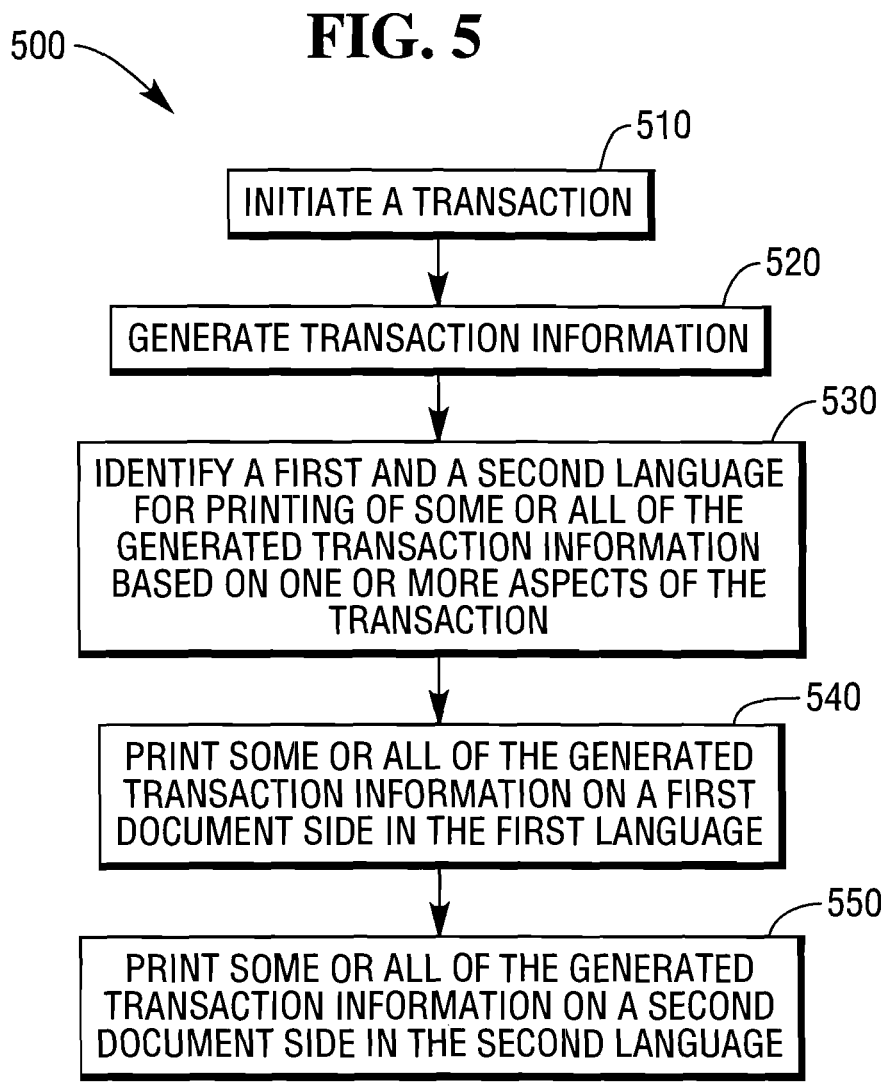

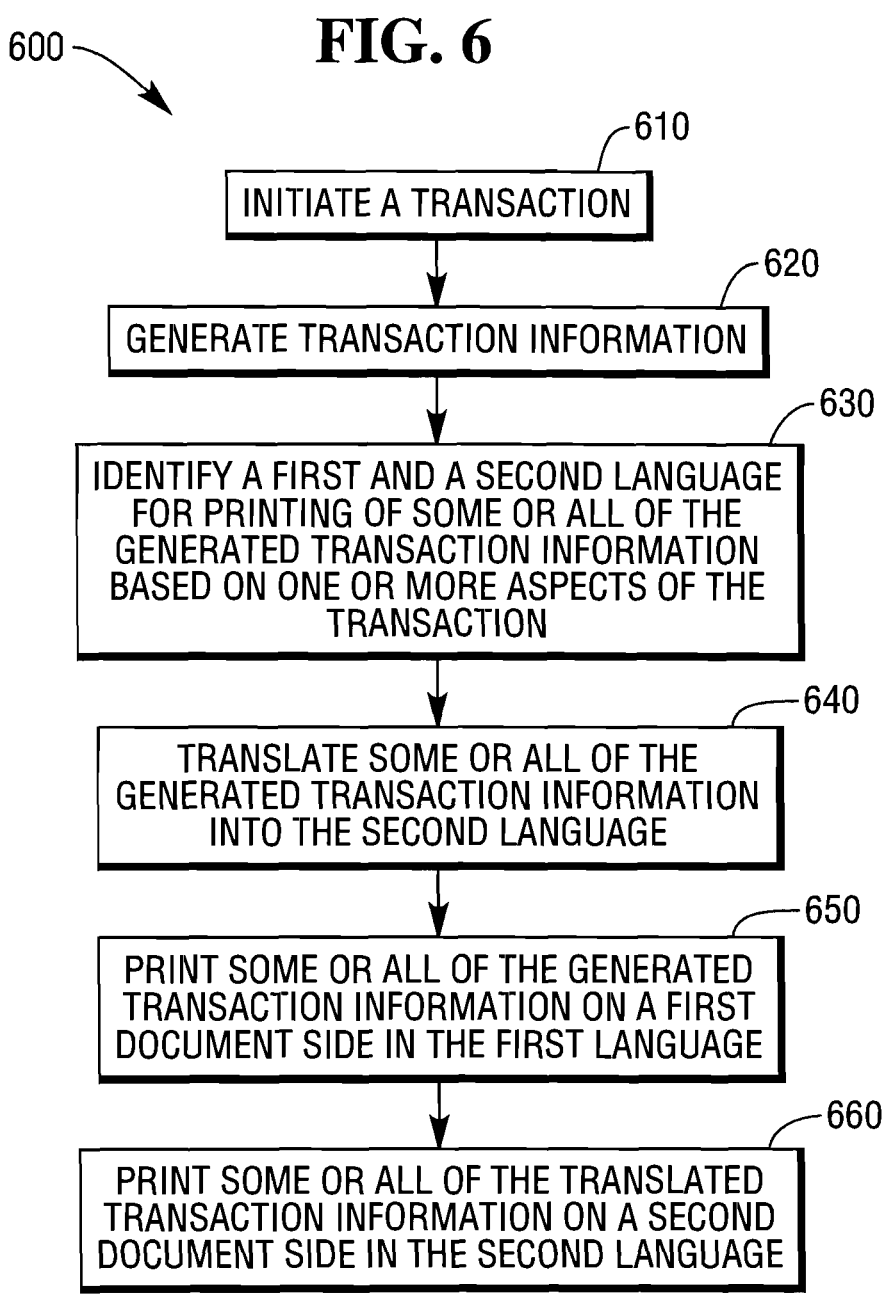

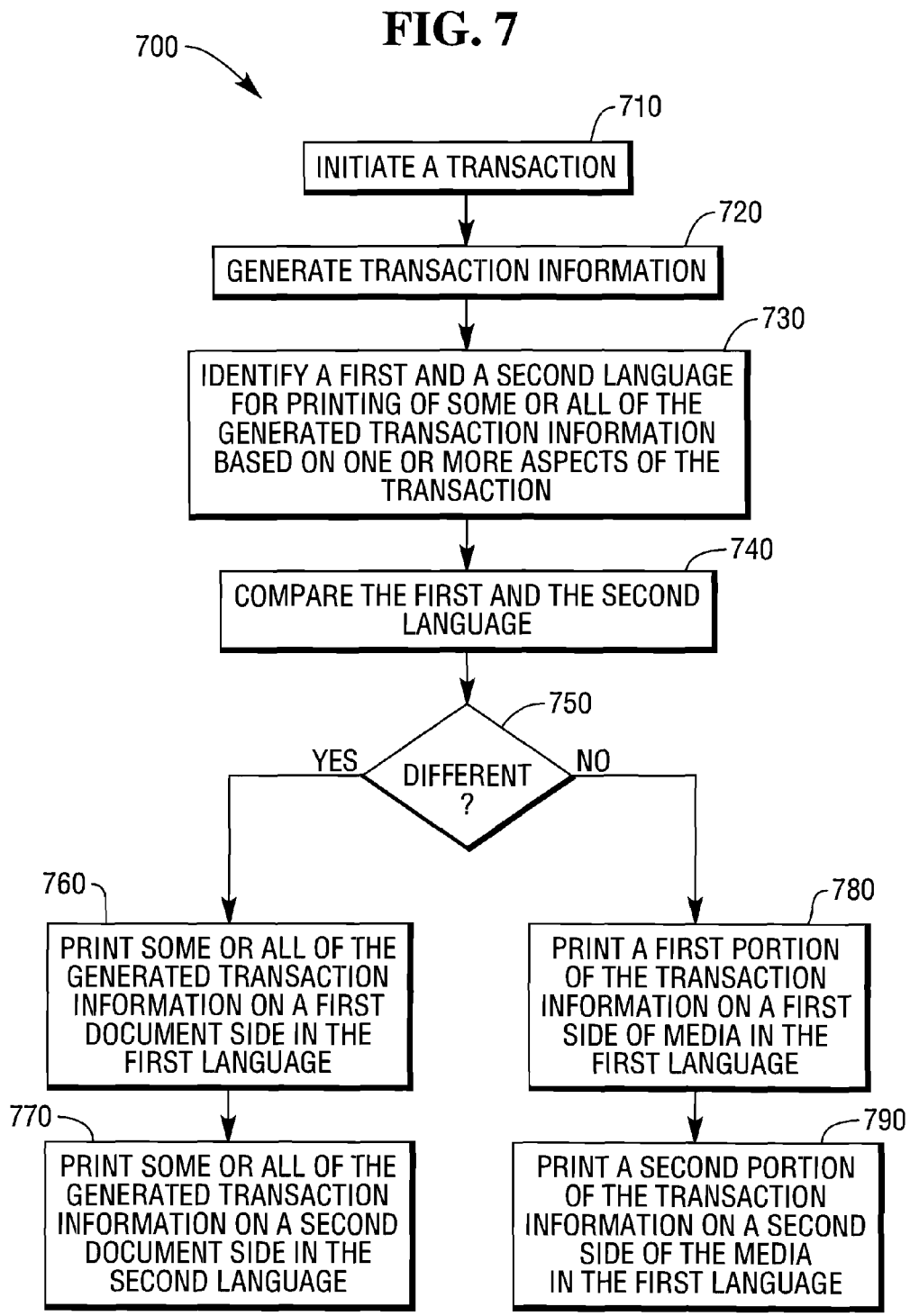

MULTI-LINGUAL TWO-SIDED PRINTING

BACKGROUND

Dual, or two-sided printing comprises the simultaneous or near simultaneous printing or imaging of a first side and a second side of print media. In two-sided printing, a two-sided printer is configured to allow concurrent printing on both sides of two-sided media moving along a media feed path through the printer. In such printers one or more print heads are disposed on each of two sides of the media for selective printing on and/or imaging thereof. Two-sided printing may be used for the production of two-sided documents such as two-sided transaction receipts as described in U.S. Pat. Nos. 6,784,906 and 6,759,366 the contents of which are hereby incorporated by reference herein.

SUMMARY

In various embodiments, variable and/or predefined information may be printed in one or more languages on a first side of two-sided media, and in one or more languages on a second side of the two-sided media, during and/or incident to the performance of a transaction. Depending on the embodiment, selection of the one (e.g., a first) or more (e.g., a second) print languages may be based on one or more aspects of the performed transaction such as, but not limited to: (i) a location (e.g., a region, nation, state, county, town, plot, coordinate, and the like) associated with the transaction, including a location associated with a party to the transaction (e.g., nationality, citizenship, residence, and/or address of a natural and/or artificial (e.g., a corporation, a business, a store, etc) person, and the like), and/or a location associated with an object of the transaction (e.g., travel and/or shipping origin and/or destination, entertainment and/or dining event location, and the like), (ii) a type and/or characteristic of a party to and/or associated with the transaction (e.g., a seller, purchaser, lessor, lessee, lender, borrower, licensor, licensee, carrier, traveler, entertainer, event manager, event attendee, beneficiary, and the like), (iii) a type of document (e.g., purchase receipt, event ticket, travel voucher, direction document, bank statement, discount offer, purchase agreement, lease agreement, loan agreement, shipping or other label, and the like) issued and/or utilized as part of the transaction, (iv) an object (e.g., goods and/or services purchased, and the like) of the transaction, (v) an applicable law and/or regulation governing and/or applying to the transaction, and the like.

Additionally, in various embodiments, monetary information (e.g., price, cost, balance, debit, credit, residual value, benefit, and the like) associated with a transaction may be printed in one (e.g., a first) or more (e.g., a second) currency units on a first and/or a second side of the two-sided media, wherein the one or more currency units may also be selected according to one or more of the above described transaction aspects.

Such solutions may be used to, for example, provide transaction information in a first and a second language on a respective first (e.g., front) and second (e.g., back) side of a transaction document such as, but not limited to, a receipt, ticket, voucher, direction document, bank statement, discount offer, purchase agreement, lease agreement, loan agreement, shipping document or label, and the like, according to a desired or required language of one or more parties associated with the transaction (e.g., clerk, teller, shipper, customer, payee, addressee, beneficiary, and the like), minimizing media consumption while providing multi-lingual information for enhanced document usability and clarity of communication.

BRIEF DESCRIPTION OF DRAWINGS

FIG. 2A illustrates a first side of a document in the form of a two-sided transaction receipt including transaction information printed in a first language thereon.

FIG. 2B illustrates a second side of the two-sided transaction receipt of FIG. 2A including the transaction information from the first side printed in a second language thereon.

FIG. 3A illustrates a first side of a document in the form of a two-sided transaction receipt including transaction and targeted discount offer information printed in a first language thereon.

FIG. 3B illustrates a second side of the two-sided transaction receipt of FIG. 3A including the transaction and targeted discount offer information from the first side printed in a second language thereon.

FIG. 5 illustrates a first method of printing of a first and a second side of a two-sided document.

FIG. 6 illustrates a second method of printing of a first and a second side of a two-sided document.

FIG. 7 illustrates a third method of printing of a first and a second side of a two-sided document.

DETAILED DESCRIPTION

By way of example, various embodiments of the invention are described in the material to follow with reference to the included drawings. Variations may be adopted.

Figure 1A:
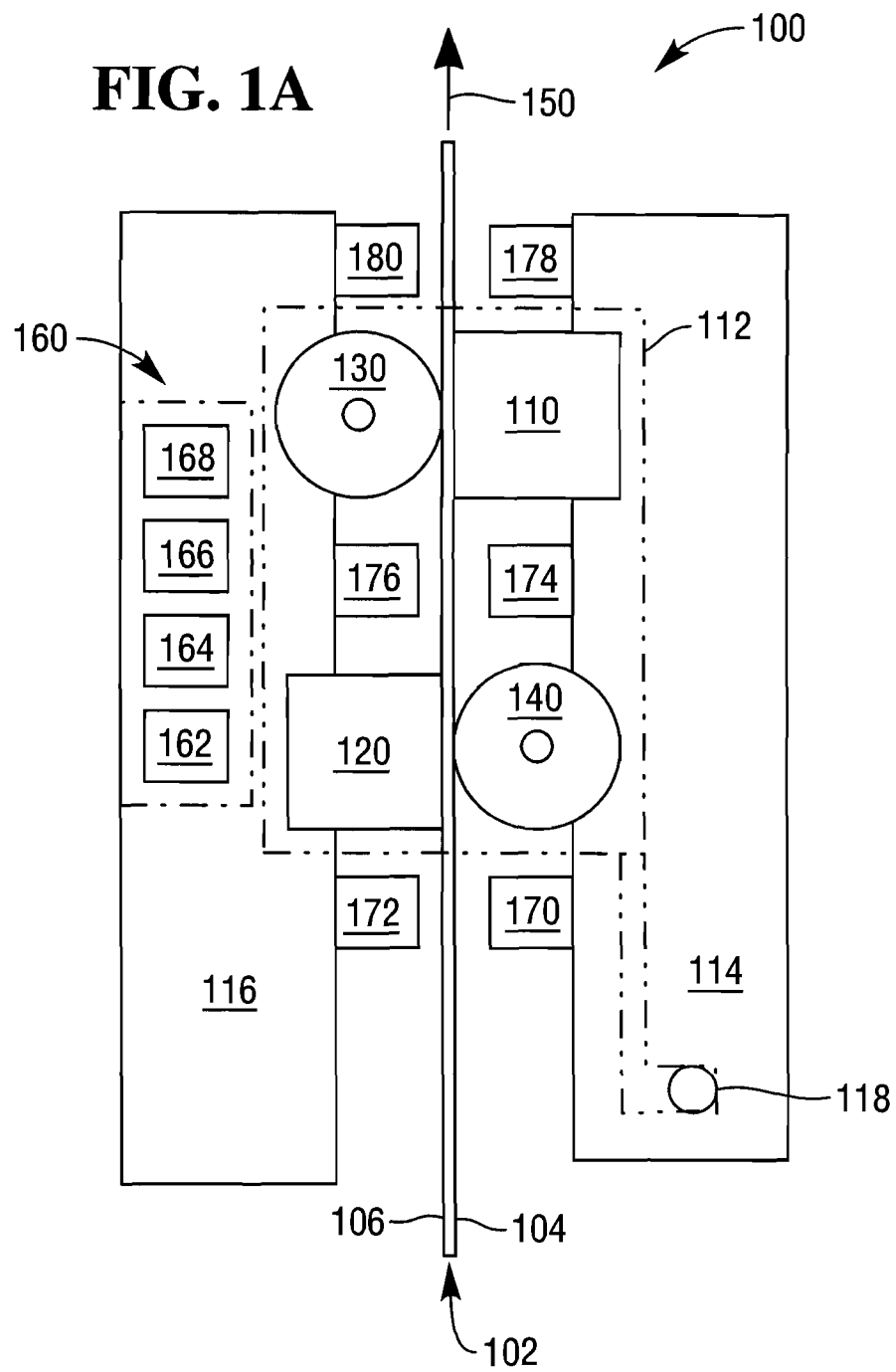
FIG. 1A provides a schematic of a two-sided printer for use in, inter alia, printing a two-sided transaction document.

FIG. 1A illustrates a two-sided printer 100 for simultaneous or near-simultaneous two-sided printing of two-sided media 102. As shown in FIG. 1A, a two-sided printer 100 may comprise first and second print heads 110, 120 for printing on respective first and second sides 104, 106 of two-sided media 102 moving along a media feed path 150. Additionally, first and second platens 130, 140 may be provided on opposite sides of the media 102 and feed path 150 thereof, proximate to the first and second print heads 110, 120, in order to, for example, maintain contact between the first and second print heads 110, 120 and a respective first and second side 104, 106 of the media 102.

Depending on the printer design and/or application, the first and/or second print heads 110, 120 may comprise one or more of a thermal print head, an ink jet print head, an impact print head, and the like. Further, in some embodiments, the first and/or second print heads may comprise laser type print heads or means. In one embodiment, the first and the second print heads 110, 120 comprise thermal print heads for printing of two-sided direct thermal media 102 as described in, for example, U.S. Pat. Nos. 6,759,366 and 6,783,906, the contents of which are hereby incorporated herein by reference.

Similarly, and depending on the printer design and/or application, print media 102 for use in a two-sided printer 100 may comprise one or more cellulosic and/or polymeric substrates coated on one or both sides thereof with one or more direct thermal, thermal transfer, ink jet, impact, laser, and the like receptive and/or sensitive coatings for thermal, inkjet, impact, laser, and the like printing thereon. Further, and depending on the printer design and/or application, the media 102 may be supplied in the form of a roll, fan-fold stock, individual (cut) sheets, and the like. In use, information in text and/or graphic form may be printed and/or imaged on one or both sides of two-sided media 102 through use of a two-sided printer 100 to provide, for example, a document in the form of a purchase receipt, event ticket, travel voucher, direction document, bank statement, discount offer, purchase agreement, lease agreement, loan agreement, shipping or other label, and the like.

As shown in FIG. 1A, a two-sided printer 100 may further include a controller 160 for controlling operation of the printer 100. The controller 160 may comprise a communication controller 162, one or more buffers or memory elements 164, a processor 166, and/or a printing function switch 168. The communication controller 162 may provide for transmitting and/or receiving print commands and/or data to and/or from an associated host computer or terminal such as a point-of-sale (POS) terminal 1000, an automated teller machine (ATM) (not shown), a self-checkout system (not shown), a hotel kiosk (not shown), a travel ticket kiosk 1100, a personal computer (not shown), and the like, associated with a printer 100. The communications controller 162 may provide for input of data to, and/or output of data from, the printer 100 pursuant to one or more wired (e.g., parallel, serial/USB, Ethernet, etc) and/or wireless (e.g., 802.11, 802.15, IR, etc) communication protocols, among others.

The one or more buffers or memory elements 164 may provide for short or long term storage of received print commands and/or data. As such, the one or more buffer or memory elements 164 may comprise one or more volatile (e.g., dynamic or static RAM) and/or non-volatile (e.g., EEPROM, flash memory, optical, magnetic, etc) memory elements. In one embodiment, a two-sided printer 100, such as a two-sided direct thermal printer, includes a first and a second memory element or storage area 164 wherein the first memory element or storage area 164 is adapted to store data identified for printing by one of the first and the second print heads 110, 120, while the second memory element or storage area 164 is adapted to store data identified for printing by the other of the first and the second print heads 110, 120.

In some embodiments, a two-sided printer 100 may additionally include a third memory element or storage area 164 in the form of a received print data storage buffer adapted to store data received by the printer 100 for printing by a first and/or a second thermal print head 110, 120. Data from the received print data storage buffer 164 may, then, be retrieved and processed by a processor 166 and/or printing function switch 168 associated with the printer 100 in order to, for example, split the received print data into a first data portion for printing on a first side 104 of two-sided media 102 by a first print head 110, and a second data portion for printing on a second side 106 of the two-sided media 102 by a second print head 120. Once a split determination has been made, such first and second data portions may, in turn, be stored in respective first and second memory elements or storage areas 164 in preparation for printing by the respective first and second print heads 110, 120.

Depending on the embodiment, a two-sided printer 100 may further include one or more predefined memory elements or storage areas 164 for storage of predefined print data comprising, for example, one or more of a coupon or other discount offer, a logo, a header, a serialized cartoon, a condition of sale, a graphic or other image such as a bar code, an advertisement, a security feature, rebate or contest information, ticket information, legal information such as a disclaimer, a warranty, or a return policy, a location (e.g., address, store, etc) information, contact information (e.g., phone number, URL, etc), and the like. Some or all of such predefined print data may then be selected for printing on one or both sides of installed two-sided media 102 along with, or separately from, externally received print data, such as transaction data received from a POS terminal (not shown) associated with the two-sided printer 100.

As further illustrated in FIG. 1A, a two-sided printer 100 may also include first and second support arms 114, 116. The first support arm 114 may further be journaled on an arm shaft 118 to permit it to pivot or rotate in relation to the second support arm 116 in order to, for example, facilitate access to, and servicing of, the two-sided printer 100, including loading of two-sided media 102 therein. In alternate embodiments, the first and second support arms 114, 116 may be in a fixed relation to one another.

Where provided, a first print head 110 and a second platen 140 may be coupled to or formed integrally with a first support arm 114, while a second print head 120 and a first platen 130 may be coupled to or formed integrally with a second support arm 116. In alternate embodiments (not shown), a first print head 110 and a first platen 130 may be coupled to or formed integrally with a first support arm 114 while a second print head 140 and a second platen 120 may be coupled to or formed integrally with a second support arm 116. Additional variations in component design and/or configuration, including two-sided printer 100 designs wherein a first and a second print head 110, 120, and a first platen 130 are coupled to or formed integrally with a second arm 116 while a second platen 140 is coupled to or formed integrally with a first support arm 114, or a first and a second print head 110, 120 and a first and a second platen 130, 140 are coupled to or formed integrally with a first or a second arm 114, 116, and the like, are also possible.

As shown in FIG. 1A, a two-sided printer 100 may further include a drive system 112 for transporting media 102 through the printer 100 during a print process. A drive system 112 may comprise one or more motors (e.g. stepper, servo, and the like) (not shown) for powering a system of gears, links, cams, belts, wheels, pulleys, rollers, combinations thereof, and the like. In one embodiment, a drive system 112 comprising a stepper motor and one or more gears adapted to rotate one or both of a first and a second platen 130, 140 in the form of circular cylinders is provided to transport media 102 through the printer 100. In alternate embodiments, a drive system 112 comprising a stepper motor operatively connected to one or more dedicated drive (e.g., non-platen) rollers (not shown) may be provided.

In one embodiment, a two-sided printer 100 in the form of a two-sided direct thermal printer such as a model 7168 two-sided multifunction printer sold under the RealPOS trademark by NCR Corporation is provided comprising first and second thermal print heads 110, 120, and first and second rotating platens 130, 140 to facilitate printing of both sides of two-sided media 102 in the form of a roll of two-sided direct thermal media installed therein.

Figure 1B:
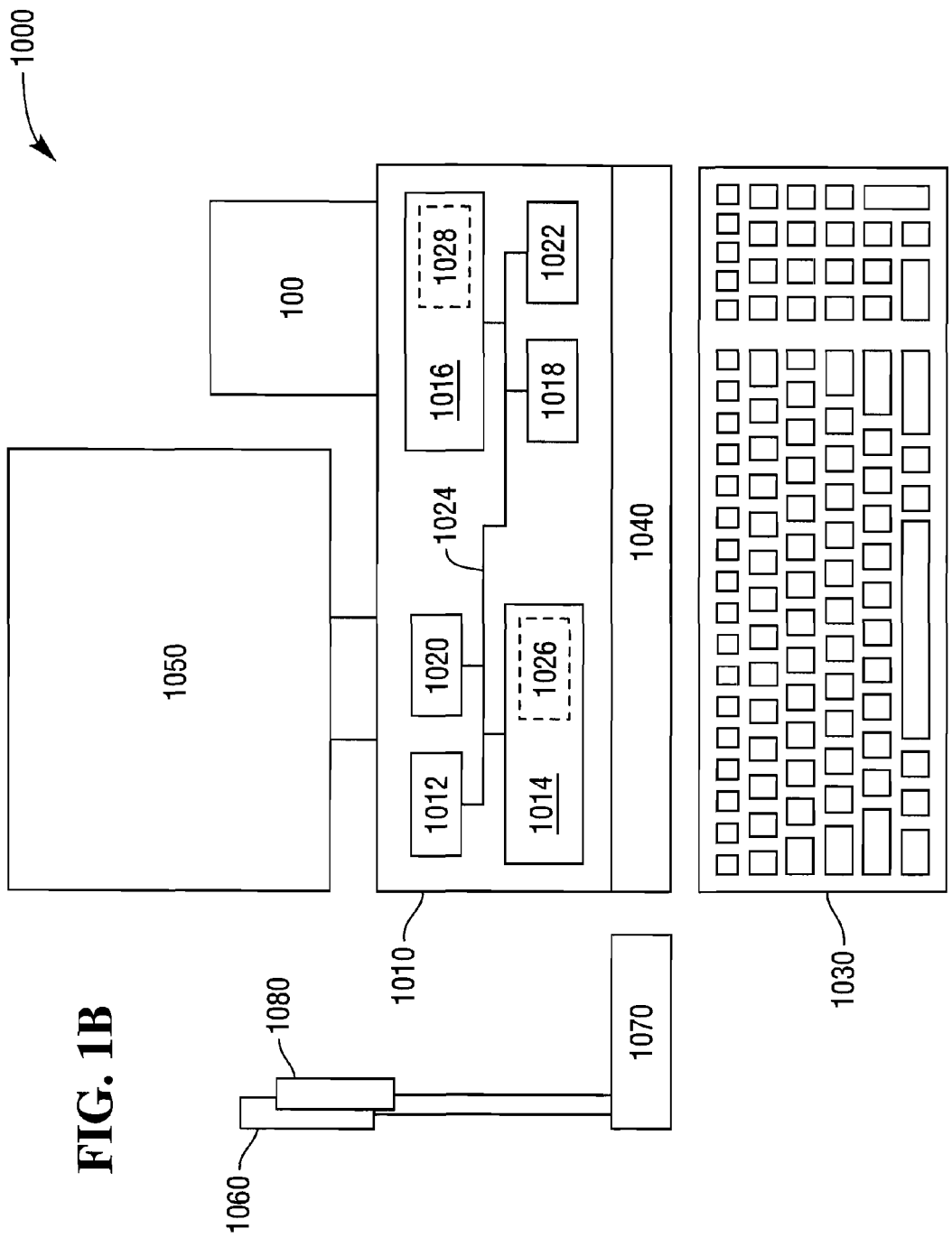
FIG. 1B provides a schematic of a point-of-sale (POS) terminal for use in, inter alia, a retail purchase transactions.

FIG. 1B illustrates a point-of-sale (POS) terminal 1000 for use in the performance of, inter alia, goods and/or services purchase transactions. As shown in FIG. 1B, a POS terminal 1000 may include a computer 1010 comprising a processor 1012, volatile (e.g., dynamic or static RAM) memory 1014, non-volatile (e.g., EEPROM, flash, optical, magnetic, etc) memory 1016, a communication controller 1018, a video controller 1020, and a power supply 1022, all interconnected by a bus 1024. In addition, a POS terminal 1000 may comprise a keyboard 1030, a cash drawer 1040, a primary display 1050, a secondary display 1060, a product (e.g., optical) scanner 1070, a card or other item reader 1080, and a printer 100, such as the two-sided printer 100 of FIG. 1A, which components 1030, 1040, 1050, 1060, 1070, 1080, 100 may further be appropriately interconnected and/or otherwise in communication with each other and/or the computer 1010.

As further shown in FIG. 1B, a POS terminal 1000 may also comprise one or more software packages comprising one or more operating systems and/or application programs 1026, 1028 residing on volatile 1014 and/or non-volatile 1016 memory for use in effectuating a purchase transaction.

In operation, a merchant (not shown) may enter data concerning one or more products or services identified for purchase into a POS terminal 1000 (e.g., into a memory 1014 of a computer 1010 associated with a POS terminal 1000) through use of an associated product (e.g., UPC bar code) scanner 1070. After data concerning all such products and/or services has been entered, a buyer may enter data concerning one or more payment means, such as a debit card, into the POS terminal 1000 using an associated card reader 1080 in order to effectuate payment for the goods and/or services. Pending authorization of payment, a printer such as a two-sided printer 100 associated with the POS terminal 1000 may issue a transaction receipt providing, inter alia, an itemization of purchased goods and/or services, and the individual and/or total cost thereof. In one embodiment, an issued transaction receipt may comprise a multi-lingual two-sided receipt 200 providing, inter alia, fixed and/or variable information in a first language on a first side and a second language on a second side of the receipt 200, wherein such first and second language may be selected based on one or more aspects of the transaction.

Figure 1C:
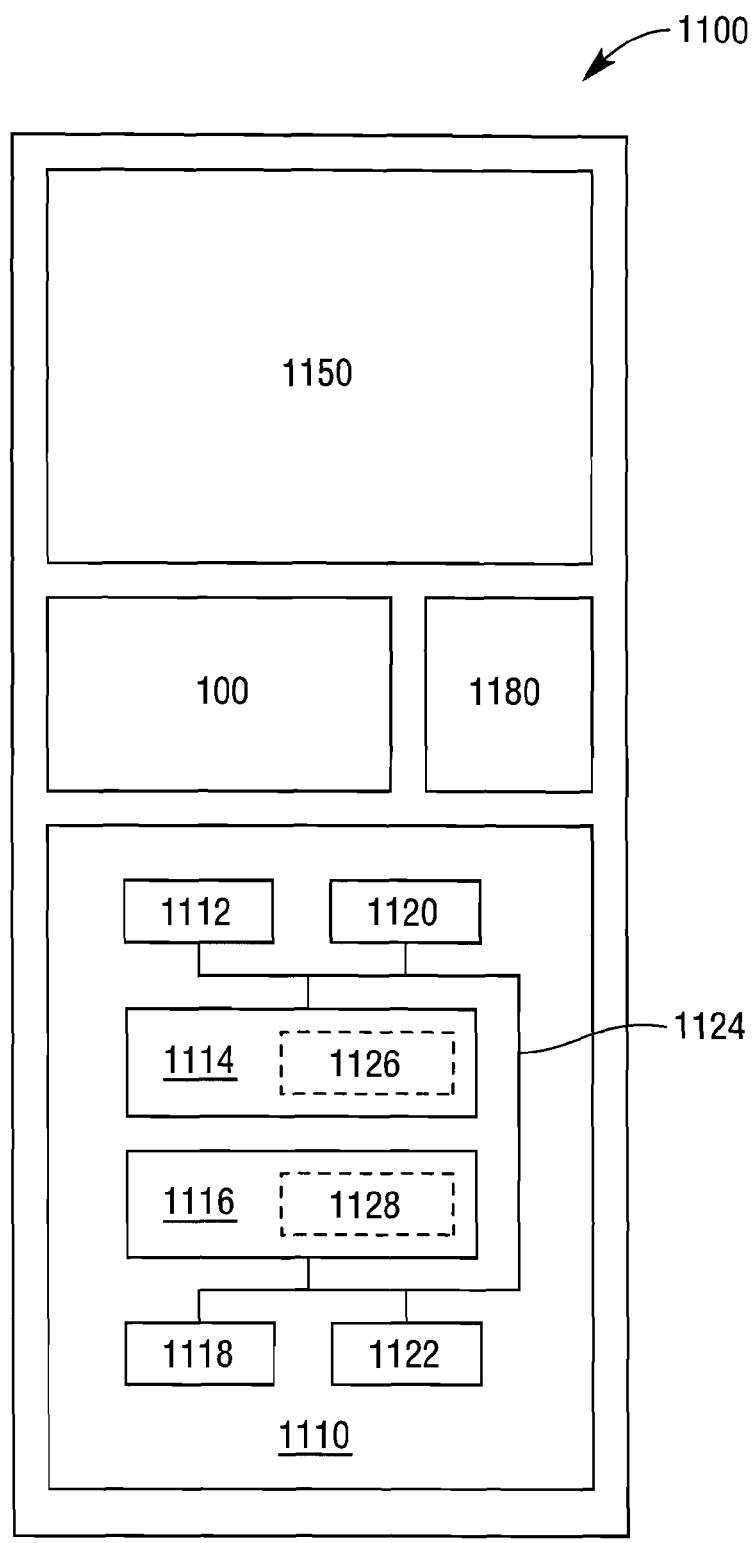
FIG. 1C provides a schematic of a travel ticket kiosk for use in, inter alia, airline ticketing transactions.

FIG. 1C illustrates a travel ticket kiosk 1100 for use in the performance of, inter alia, travel ticket transactions. As shown in FIG. 1C, a travel ticket kiosk 1100 may include a computer 1110 comprising a processor 1112, volatile (e.g., dynamic or static RAM) memory 1114, non-volatile (e.g., EEPROM, flash, optical, magnetic, etc) memory 1116, a communication controller 1118, a video controller 1120, and a power supply 1122, all interconnected by a bus 1124. In addition, a travel ticket kiosk 1100 may comprise one or more data input and/or output devices such as a touch screen 1150, a card or other item reader 1180, and a printer 100, such as the two-sided printer 100 of FIG. 1A, which components 1150, 1180, 100 may further be appropriately interconnected and/or otherwise in communication with each other and/or the computer 1110.

As further shown in FIG. 1C, a travel ticket kiosk 1100 may also comprise one or more software packages comprising one or more operating systems and/or application programs 1126, 1128 residing on volatile 1120 and/or non-volatile 1122 memory for use in effectuating a travel ticket procurement transaction.

In operation, a user/traveler (not shown) may initiate a transaction by inserting one or more personally identifying items such as, but not limited to, one or more of a bank card, a credit card, a debit card, a loyalty card, a membership card, a key card, a smart card, a memory card, an access badge, a driver's license, a passport, a state, regional, national or other identification card, and the like, into a reader 1180 associated with the travel ticket kiosk 1100 for extraction of information therefrom identifying the user/traveler. Once identified, a user may select among options provided by a ticket procurement application program 1128 operating on the travel ticket kiosk 1100 including selection and/or verification of related flight(s), seat(s), and travel time(s). Upon completion of such selection and/or verification, a boarding pass 400 and/or an accompanying receipt may be automatically and/or manually selected for issuance from a printer such as a two-sided printer 100 associated with the travel ticket kiosk. Depending on the embodiment, such boarding pass 400 and/or receipt may include, inter alia, fixed and/or variable travel and/or cost information in a first language on a first side and a second language on a second side thereof, wherein such first and second language may be selected based on one or more aspects of a related travel transaction.

FIGS. 2A and 2B illustrate respective first and second sides 202, 204 of a two-sided document in the form of a multi-lingual two-sided receipt 200. As shown in FIGS. 2A and 2B, a multi-lingual two-sided receipt 200 may comprise transaction information in the form of one or more product purchase line item entries 220, 224 in each of a first (e.g., English) and a second (e.g., Spanish) language on respective first 202 and second 204 sides thereof. Additionally, and as further shown in FIGS. 2A and 2B, a multi-lingual two-sided receipt 200 may further comprise a first and a second header 210, 212 on each of the first and second sides 202, 204 thereof, which headers 210, 212 may further be provided in each of the first and second languages on respective first and second sides 202, 204. As will be described further hereinbelow, each of the first and the second languages may be selected based on, inter alia, one or more aspects of an associated transaction such as, but not limited to, a location (e.g., country, region, and/or nationality) associated with a party to the transaction.

Furthermore, a two-sided document such as a multi-lingual two-sided transaction receipt 200 may comprise a first and a second footer 260, 262 on respective first and second sides 202, 204 thereof. In the embodiment illustrated in FIGS. 2A and 2B, first and second footers 260, 262 comprising first and second bar codes 260, 262 are provided in a consistent (re. identical) bar code symbology. However, it should be noted that in other embodiments, the first bar code 260 may be provided in a first symbology on the first side 202 of a receipt 200, while the second bar code 262 may be provided in a second symbology on the second side 204 of the receipt 200 which symbologies may be selected based on one or more aspects of a related transaction such as, but not limited to, a location (e.g., country, region, and/or nationality) associated with the transaction.

As further shown in FIGS. 2A and 2B, a two-sided document such as a multi-lingual two-sided receipt 200 may include monetary information comprising, for example, cost information 222, 226 for each of the product line item entries 220, 224 on the receipt 200. As shown in FIGS. 2A and 2B, such cost information 222, 226 may be provided in a first currency unit (e.g., U.S. Dollars) on the first side 202 of the multi-lingual two-sided receipt 200, and a second currency unit (e.g., Euros) on the second side 204 thereof. As for selection of the first and second language, and/or first and second bar code symbology, the first and second currency unit may be selected based on one or more aspects of an associated transaction such as, but not limited to, a location (e.g., country, region, and/or nationality) associated with the transaction.

Depending on the embodiment, a first and/or a second language, a first and/or a second currency unit, and/or a first and/or a second bar code symbology (etc) utilized for printing of a first and/or a second side of a two-sided document, such as the multi-lingual two-sided receipt 200 of FIGS. 2A and 2B, may be selected based on one or more aspects of a related transaction including, but not limited to: (i) a location (e.g., a region, nation, state, county, town, plot, coordinate, and the like) associated with the transaction, including a location associated with a party to the transaction (e.g., nationality, citizenship, residence, and/or address of a natural and/or artificial (e.g., a corporation, a business, a store, etc) person, and the like), and/or a location associated with an object of the transaction (e.g., travel and/or shipping origin and/or destination, entertainment and/or dining event location, and the like), (ii) a type and/or characteristic of a party to and/or associated with the transaction (e.g., a seller, purchaser, lessor, lessee, lender, borrower, licensor, licensee, carrier, traveler, entertainer, event manager, event attendee, beneficiary, and the like), (iii) a type of document (e.g., purchase receipt, event ticket, travel voucher, direction document, bank statement, discount offer, purchase agreement, lease agreement, loan agreement, shipping document or label, and the like) issued and/or utilized as part of the transaction, (iv) an object (e.g., goods and/or services purchased, and the like) of the transaction, (v) an applicable law and/or regulation governing and/or applying to the transaction, and the like.

For example, a Spanish national may desire to purchase the grocery items 220, 224 indicated on the receipt 200 of FIGS. 2A and 2B at a store ("Our Store"/"Nuestro Almacén") in a town ("Any Town"/"Cualquier Ciudad") in the United States (U.S.) through interaction with a merchant operating a POS terminal 1000 therein. In such case, a receipt 200 may be issued by a printer 100 associated with the POS terminal 1000 upon completion of the purchase transaction, wherein the receipt 200 includes transaction information in English (e.g., a language associated with a location (country) of the store) on a first side 202 thereof, and in Spanish (e.g., a language associated with a nationality (Spain) of the purchaser) on a second side 204 thereof. Likewise, cost 222, 226 of the purchased items 220, 224 may be provided in U.S. Dollars (e.g., a currency unit associated with the purchase location) on the first side 202 of the receipt 200, and in Euros (e.g., a currency unit associated with a nationality of the purchaser) on the second side 204 of the receipt 200. Such methodology enables ready review of transaction information by both a merchant and a purchaser, clarifying the transaction terms and permitting, inter alia, ready review of a purchase and/or return of purchased goods.

In the above described grocery purchase example, selection of a first language (e.g., English) according to a first transaction aspect, namely a location of a store, may in practice be made based on an operating and/or a default language of (i) a host computer or terminal, such as, but not limited to, the POS terminal 1000 used to effectuate the transaction, and/or (ii) an associated printer 100 used for printing of a transaction receipt 200. Alternatively or additionally, selection of the first language may be made based on one or more operator defined language settings for a host computer or terminal, and/or an associated printer 100.

It should be noted that in other embodiments a variety of host computers and/or terminals, including but not limited to one or more of an ATM (not shown), a self-checkout system (not shown), a hotel kiosk (not shown), a travel ticket kiosk 1100, a personal computer (not shown), and the like, may be used to effectuate a transaction in addition to a POS terminal 1000.

In further reference to the above described grocery purchase transaction, selection of a second language (e.g., Spanish) according to a second transaction aspect, namely a language associated with a nationality of the purchaser of the groceries (e.g., Spain), may in practice be made based on nationality and/or like (e.g., residence/address) information directly entered into the POS terminal 1000 and/or associated printer 100 by the purchaser and/or merchant. Additionally or alternatively, nationality and/or like (e.g., residence/address) information pertaining to a purchaser may be indicated by and/or obtained through entry (e.g., reading, scanning, and the like) into the POS terminal 1000 and/or printer 100 of information from one or more items associated with the purchaser including, but not limited to: a bank card, a credit card, a debit card, a loyalty card, a membership card, a key card, a smart card, a memory card, an access badge, a driver's license, a passport, a state, regional, national or other identification card, and the like, during execution of the transaction.

For example, in one embodiment, a party to a retail purchase transaction such as the purchaser of the groceries indicated by the multi-lingual two-sided receipt 200 of FIGS. 2A and 2B may scan a payment (e.g., bank, credit, debit, smart, and the like) or other (e.g., loyalty, membership, identification, memory, and the like) card through a card reader 1080 associated with a POS terminal 1000 in order to, inter alia, effectuate payment for the groceries. Such card reader 1080 may, then, extract information stored on or in the card (e.g., on or in one or more magnetic stripes, memory chips, bar codes, alphanumeric passages, and the like, associated with the card), which information may directly and/or indirectly (e.g., through exchange with one or more local and/or remote datastores) indicate an address (e.g., street, city, county, region and/or country) associated with the purchaser. Once suitable address information has been obtained, a lookup table and/or database accessible to the POS terminal 1000 and/or printer 100 may be searched to identify a language associated therewith, which language may then be selected as a language (e.g., a second language) for printing of transaction information on one or more sides (e.g., a second side) of a receipt (e.g., multi-lingual two-sided receipt 200) to be issued as part of the transaction. In other embodiments, a language may be directly and/or indirectly indicated from the read card information, such as in a loyalty card scheme indicating a holder's language choice, which preferred language may then be utilized for printing of one or more sides of a two-sided documents such as a multi-lingual two-sided receipt 200.

FIGS. 3A and 3B illustrate respective first and second sides 302, 304 of a two-sided document in the form of a multi-lingual transaction receipt 300. As shown in FIGS. 3A and 3B, a multi-lingual transaction receipt 300 may comprise transaction information in the form of one or more product purchase line item entries 320, 324 in each of a first (e.g., English) and a second (e.g., French) language on respective first 302 and second 304 sides thereof. Additionally, and as further shown in FIGS. 3A and 3B, a multi-lingual transaction receipt 300 may further comprise a first and a second header 310, 312 on each of the first and second sides 302, 304 thereof, which headers may further be provided in each of the first and second languages on the respective first and second sides 302, 304. As described previously, each of the first and the second languages may be selected based on, inter alia, one or more aspects of an associated transaction such as, but not limited to, a location (e.g., country, region, and/or nationality) associated with a party to the transaction.

As shown FIGS. 3A and 3B, a multi-lingual transaction two-sided receipt 300 may also include a first and a second footer 360, 362 on respective first and second sides 302, 304 thereof. In the embodiment of FIGS. 3A and 3B the respective first and second footers 360, 362 comprise bar codes provided in a consistent (re. identical) bar code symbology. However, it should be noted that in other embodiments, the first 360 bar code may be provided in a first symbology on the first side 302 of a receipt 300, while the second bar code 362 may be provided in a second symbology on the second side 304 of the receipt 300, wherein the first and/or the second symbology may be selected based on one or more aspects of a related transaction such as, but not limited to, a location (e.g., country, region, and/or nationality) associated with the transaction.

As further shown in FIGS. 3A and 3B, a two-sided document such as a multi-lingual two-sided receipt 300 may include monetary information comprising, for example, cost information 322, 326 for each of the product line item entries 320, 324 on the receipt 300. As shown in FIGS. 3A and 3B, such cost information 322, 326 may be provided in a first currency unit (e.g., U.S. Dollars) on the first side 302 of the multi-lingual two-sided receipt 300, and a second currency unit (e.g., Euros) on the second side 304 thereof. As for selection of the first and second language, and/or first and second bar code symbology, the first and second currency unit may be selected based on one or more aspects of an associated transaction such as, but not limited to, a location (e.g., country, region, and/or nationality) associated with the transaction.

Depending on the embodiment, a first and/or a second language, a first and/or a second currency unit, and/or a first and/or a second bar code symbology (etc) utilized for printing of a first and/or a second side of a two-sided document, such as the multi-lingual two-sided receipt 300 of FIGS. 3A and 3B, may be selected based on one or more aspects of a related transaction including, but not limited to: (i) a location (e.g., a region, nation, state, county, town, plot, coordinate, and the like) associated with the transaction, including a location associated with a party to the transaction (e.g., nationality, citizenship, residence, and/or address of a natural and/or artificial (e.g., a corporation, a business, a store, etc) person, and the like), and/or a location associated with an object of the transaction (e.g., travel and/or shipping origin and/or destination, entertainment and/or dining event location, and the like), (ii) a type and/or characteristic of a party to and/or associated with the transaction (e.g., a seller, purchaser, lessor, lessee, lender, borrower, licensor, licensee, carrier, traveler, entertainer, event manager, event attendee, beneficiary, and the like), (iii) a type of document (e.g., purchase receipt, event ticket, travel voucher, direction document, bank statement, discount offer, purchase agreement, lease agreement, loan agreement, shipping or other label, and the like) issued and/or utilized as part of the transaction, (iv) an object (e.g., goods and/or services purchased, and the like) of the transaction, (v) an applicable law and/or regulation governing and/or applying to the transaction, and the like.

For example, in one embodiment, a U.S. national may desire to purchase the grocery items 320, 324 indicated on the receipt 300 of FIGS. 3A and 3B at a store ("Our Store"/"Notre Magasin") in a town ("Any Town"/"Toute Ville") in France through, for example, interaction with a merchant operating a POS terminal 1000 therein. In such case, a receipt 300 may be issued by a printer 100 associated with the POS terminal 1000 upon completion of the purchase transaction, wherein the receipt 300 includes transaction information in English (e.g., a language associated with a nationality (U.S.) of the purchaser) on a first side 302 thereof, and in French (e.g., a language associated with a location (country) of the store) on a second side 204 thereof. Likewise, cost 322, 326 of the purchased items 320, 324 may be provided in U.S. Dollars (e.g., a currency unit associated with a nationality of the purchaser) on the first side 302 of the receipt 300, and in Euros (e.g., a currency unit associated with the purchase location) on the second side 304 of the receipt 300. As previously described such methodology enables ready review of included transaction information by both a merchant and a purchaser, clarifying the transaction terms and permitting, inter alia, ready review of a purchase and/or return of purchased goods.

As further illustrated in FIGS. 3A and 3B, one or both sides 302, 304 of a multi-lingual two-sided receipt 300 may comprise additional text and/or graphic information desired or required to be printed thereon such as, but not limited to, one or more of a logo, a serialized cartoon, a condition of sale, an advertisement, a security feature, rebate or contest information, legal information (e.g., a disclaimer, a warranty, a return policy, etc), and the like. Depending on the embodiment, such additional information may be selected based on one or more aspects of a related transaction such as, but not limited to: (i) a location (e.g., a region, nation, state, county, town, plot, coordinate, and the like) associated with the transaction, including a location associated with a party to the transaction (e.g., nationality, citizenship, residence, and/or address of a natural and/or artificial (e.g., a corporation, a business, a store, etc) person, and the like), and/or a location associated with an object of the transaction (e.g., travel and/or shipping origin and/or destination, entertainment and/or dining event location, and the like), (ii) a type and/or characteristic of a party to and/or associated with the transaction (e.g., a seller, purchaser, lessor, lessee, lender, borrower, licensor, licensee, carrier, traveler, entertainer, event manager, event attendee, beneficiary, and the like), (iii) a type of document (e.g., purchase receipt, event ticket, travel voucher, direction document, bank statement, discount offer, purchase agreement, lease agreement, loan agreement, shipping or other label, and the like) issued and/or utilized as part of the transaction, (iv) an object (e.g., goods and/or services purchased, and the like) of the transaction, (v) an applicable law and/or regulation governing and/or applying to the transaction, and the like.

For example, as shown in the embodiment of FIGS. 3A and 3B, additional information may comprise a discount offer 370, 372 for an item (re. "White Wine"/"Vin Blanc") which offer may be selected based on one or more goods and/or services currently purchased (e.g., "Fish"/"Poissons"), and may further consider that the offered item (re. "White Wine"/ "Vin Blanc") is not currently purchased (re. not listed as one of the purchase line items 320, 324). Further, as shown in FIGS. 3A and 3B, additional provided information such as a discount offer 370, 372, may be personalized for a party associated with the transaction, such as a purchaser of the transaction line items 320, 324 (e.g., "for Mrs. Smith"/"pour Mme Smith"), and may be based on prior (as well as the current) purchase history.

Depending on the embodiment, personalization information (e.g., information pertaining to a purchaser) may be indicated by and/or obtained through entry (e.g., reading, scanning, and the like) into an appropriate computing device and/or terminal (e.g., a POS terminal 1000 and/or printer 100) of information from one or more items associated with the purchaser including, but not limited to: a bank card, a credit card, a debit card, a loyalty card, a membership card, a key card, a smart card, a memory card, an access badge, a driver's license, a passport, a state, regional, national or other identification card, and the like, during execution of the transaction.

For example, in one embodiment, a party to a retail purchase transaction such as the purchaser of the groceries indicated by the multi-lingual two-sided receipt 300 of FIGS. 3A and 3B may scan a payment (e.g., bank, credit, debit, smart, and the like) or other (e.g., loyalty, membership, identification, memory, and the like) card through a card reader 1080 associated with a POS terminal 1000 in order to, inter alia, effectuate payment for the groceries. Such card reader 1080 may, then, extract information stored on or in the card (e.g., or in one or more magnetic stripes, memory chips, bar codes, alphanumeric passages, and the like, associated with the card), which information may directly and/or indirectly (e.g., through exchange with one or more local and/or remote datastores) identify (e.g., indicate a name of) the purchaser. Once identified, additional information concerning such party, including past purchase histories (e.g., products, frequency, cost, etc), particular likes and/or dislikes, and the like, may be obtained through communication with one or more datastores accessible to the POS terminal 1000 and/or printer 100 for selection of an appropriate incentive for printing on a first and/or second side 302, 304 of the receipt 300.

Additional embodiments, including embodiments where graphic and/or text information 370, 372 may be provided based on a time (e.g., an hour, minute, second, day, week, month, and/or year) of purchase, a location (e.g. country and/or nationality) of purchase and/or associated with a purchaser, and the like, as well as embodiments providing for the inclusion of random discounts, coupons, cartoons, and the like, on one or both sides of a two-sided multi-lingual document, such as the two-sided multi-lingual receipt 300 of FIGS. 3A and 3B, are also possible.

Further, it should be noted that in other embodiments a variety of host computers and/or terminals, including but not limited to one or more of an ATM (not shown), a self-checkout system (not shown), a hotel kiosk (not shown), a travel ticket kiosk 1100, a personal computer (not shown), and the like, may be used for execution of some or all of a transaction, including the generation of a two-sided document such as a multi-lingual two-sided receipt 200, 300.

Figure 4A:
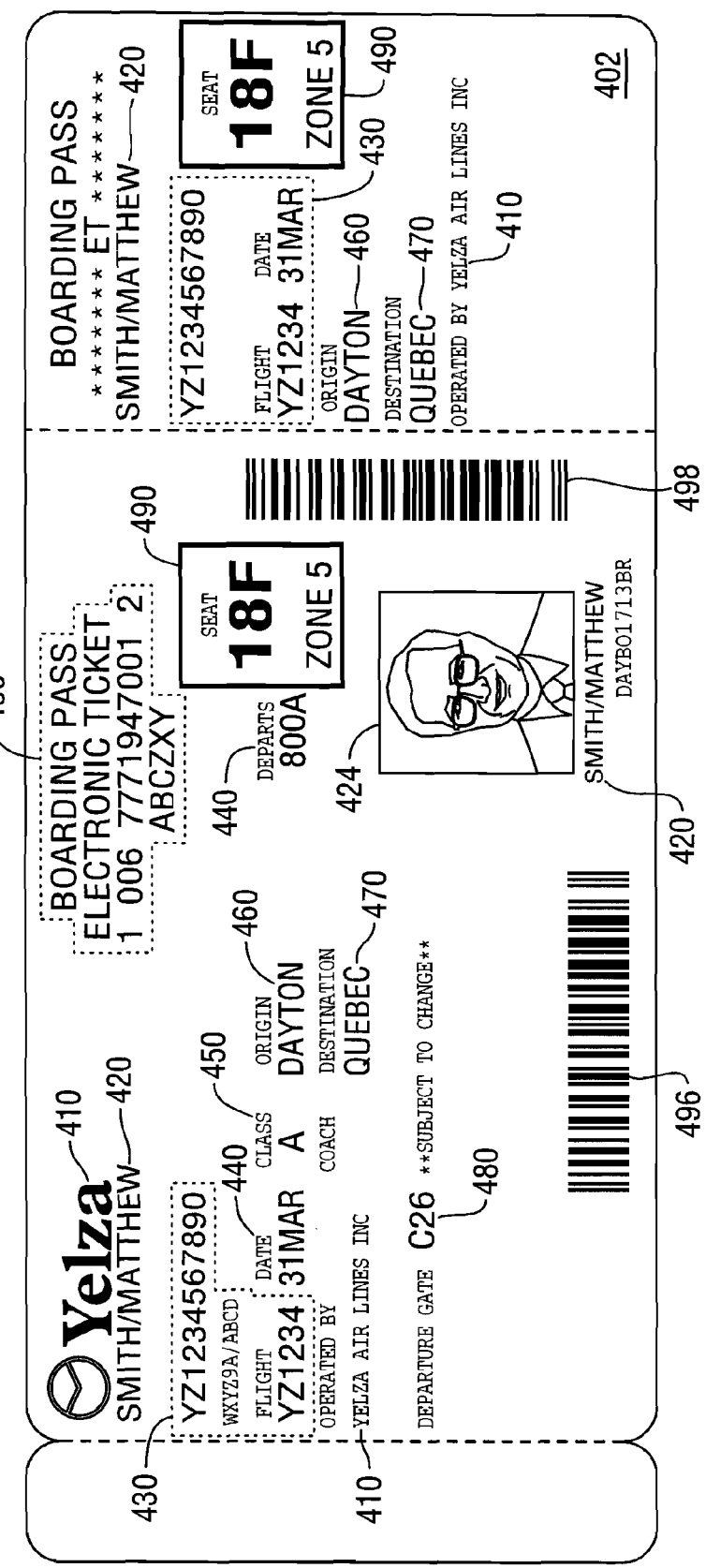
FIG. 4A illustrates a first side of a document in the form of a two-sided boarding pass including travel information printed in a first language thereon.
Figure 4B:
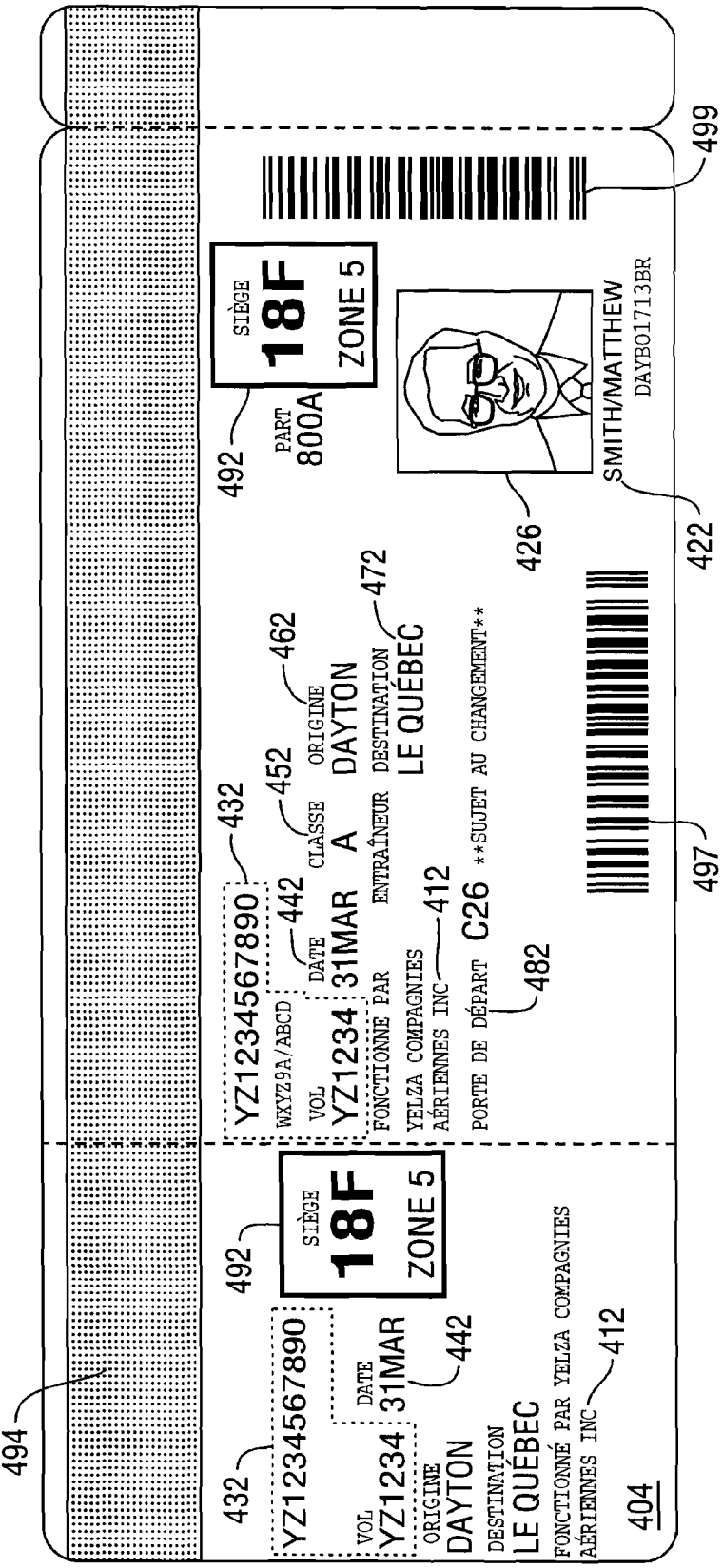
FIG. 4B illustrates a second side of the two-sided boarding pass of FIG. 4A including a portion of the travel information from the first side printed in a second language thereon.

For example, FIGS. 4A and 4B illustrate respective first and second sides 402, 404 of a two-sided document in the form of a multi-lingual boarding pass 400 issued through use of, for example, a travel ticket kiosk 1100. As shown in FIGS. 4A and 4B, a multi-lingual boarding pass 400 may comprise information relating to a travel transaction in the form of carrier (e.g., airline) information 410, 412, passenger information 420, 422, flight information 430, 432, date and/or time information 440, 442, class information 450, 452, origin information 460, 462, destination information 470, 472, gate information 480, 482, seat information 490, 492, and the like, in a first language (e.g., English) and a second language (e.g., French) on respective first 402 and second 404 sides thereof.

Additionally, and as further shown in FIGS. 4A and 4B, a multi-lingual boarding pass 400 may further comprise a magnetic stripe 494 and/or one or more bar codes 496, 497, 498, 499 on one or both sides 402, 404 thereof. Such magnetic stripe and/or bar codes may magnetically and/or optically encode some of all of the aforementioned travel information, with or without further travel and/or transaction (e.g., price, security, and the like) related information, for machine reading of the same at various points in a travel process such as a point of embarkation and/or debarkation (etc). Where provided, the one or more magnetic stripes 494 and/or bar codes 496, 497, 498, 499 may provide machine readable information according to one or more (e.g., a first and a second) encoding schemes and/or symbologies, which encoding schemes and/or symbologies may vary among a first 402 and a second 404 side of a two-sided multi-lingual boarding pass 400.

As for the multi-lingual two-sided receipts 200, 300 discussed hereinabove, the first and/or second print language, the first and/or second encoding scheme, and/or the first and/or second symbology (etc) utilized for printing of a first and/or a second side of a two-sided document such as the multi-lingual boarding pass 400 of FIGS. 4A and 4B, may be selected based on one or more aspects of a related transaction including, but not limited to: (i) a location (e.g., a region, nation, state, county, town, plot, coordinate, and the like) associated with the transaction, including a location associated with a party to the transaction (e.g., nationality, citizenship, residence, and/or address of a natural and/or artificial (e.g., a corporation, a business, a store, etc) person, and the like), and/or a location associated with an object of the transaction (e.g., travel and/or shipping origin and/or destination, entertainment and/or dining event location, and the like), (ii) a type and/or characteristic of a party to and/or associated with the transaction (e.g., a seller, purchaser, lessor, lessee, lender, borrower, licensor, licensee, carrier, traveler, entertainer, event manager, event attendee, beneficiary, and the like), (iii) a type of document (e.g., purchase receipt, event ticket, travel voucher, direction document, bank statement, discount offer, purchase agreement, lease agreement, loan agreement, shipping or other label, and the like) issued and/or utilized as part of the transaction, (iv) an object (e.g., goods and/or services purchased, and the like) of the transaction, (v) an applicable law and/or regulation governing and/or applying to the transaction, and the like.

For example, in one embodiment, a document, such as a multi-lingual two-sided boarding pass 400, may be issued to a U.S. national traveling from a domestic (e.g., U.S.) location (e.g., "DAYTON") to a foreign (e.g., Canadian) location (e.g., "QUEBEC"). In such case, travel information may be concurrently printed in English (e.g., a language associated with a travel origin, and/or the traveler, and the like) on a first side 402 of the multi-lingual boarding pass 400, while some or all of the travel information may be repeated in French (e.g., a language associated with a travel destination, and/or the traveler, and the like) on the second side 404 of the boarding pass 400 via use of a printer 100 associated with a travel ticket kiosk 1100.

Likewise, and as disclosed hereinabove with respect to purchase receipts 200, 300, travel and/or ticket cost information (not shown) may be provided in U.S. Dollars (e.g., a currency unit associated with a travel origin, and/or the traveler, and the like) on the front side 402 of the boarding pass 400 and/or related receipt (not shown), and in Canadian Dollars (e.g., a currency unit associated with a travel destination, and/or the traveler, and the like) on the second side 404 of the boarding pass 400 and/or related receipt (not shown). Such methodology enables, inter alia, ready review of travel related information by port and/or security personnel (e.g., airport, airline, customs, and the like), and the traveler, at both origin and destination locations, clarifying the transaction and enhancing security.

In some embodiments, a single travel event or trip may include multiple legs wherein a first leg of the trip may comprise, inter alia, travel from a first country and/or region to a second country and/or region, and a second leg may comprise, inter alia, travel from the second country and/or region to a third country and/or region, and the like. In such case, a first boarding pass 400 may be issued for the first travel leg having travel information printed on a first side 402 thereof in a first language and some or all of the travel information printed on a second side 404 thereof in a second language, wherein the first language may be selected based on an origin (e.g., the first country and/or region) of the first leg, and the second language may be selected based on a destination (e.g., the second country and/or region) of the first leg. Likewise, a second boarding pass 400 may be issued for the second travel leg having travel information printed on a first side 402 thereof in the second language and some or all of the travel information printed on a second side 404 thereof in a third language, wherein the second language may be selected based on an origin (e.g., the second country and/or region) of the second leg, and the third language may be selected based on a destination (e.g., the third country and/or region) of the second leg. Variations are possible, including embodiments where the first, second and/or third language are additionally or alternately selected based on a nationality of and/or language spoken by a traveler and/or airport, customs and/or security personnel, and the like.

As previously described hereinabove with regard to a multi-lingual two-sided receipt such as the multi-lingual two-sided receipt 300 of FIGS. 3A and 3B, one or both sides 402, 404 of a two-sided multi-lingual boarding pass 400 may comprise additional text and/or graphic information desired or required to be printed thereon such as, but not limited to, one or more of a logo, a serialized cartoon, a condition of sale, an advertisement, a security feature, rebate or contest information, legal information (e.g., a disclaimer, a warranty, a return policy, etc), and the like. Depending on the embodiment, such additional information may be selected based on one or more aspects of a related transaction such as, but not limited to: (i) a location (e.g., a region, nation, state, county, town, plot, coordinate, and the like) associated with the transaction, including a location associated with a party to the transaction (e.g., nationality, citizenship, residence, and/or address of a natural and/or artificial (e.g., a corporation, a business, a store, etc) person, and the like), and/or a location associated with an object of the transaction (e.g., travel and/or shipping origin and/or destination, entertainment and/or dining event location, and the like), (ii) a type and/or characteristic of a party to and/or associated with the transaction (e.g., a seller, purchaser, lessor, lessee, lender, borrower, licensor, licensee, carrier, traveler, entertainer, event manager, event attendee, beneficiary, and the like), (iii) a type of document (e.g., purchase receipt, event ticket, travel voucher, direction document, bank statement, discount offer, purchase agreement, lease agreement, loan agreement, shipping or other label, and the like) issued and/or utilized as part of the transaction, (iv) an object (e.g., goods and/or services purchased, and the like) of the transaction, (v) an applicable law and/or regulation governing and/or applying to the transaction, and the like.

Further, in some embodiments, additional text and/or graphic information may comprise information about a party to and/or associated with a transaction such as, but not limited to, an image of a party, such as the image 424, 426 of the traveler shown on the multi-lingual two-sided boarding pass 400 of FIGS. 4A and 4B. Such image may be provided through, inter alia, reading, scanning, inputting, and the like, of information from one or more personally identifying documents and/or cards including, but not limited to, one or more of a bank card, a credit card, a debit card, a loyalty card, a membership card, a key card, a smart card, a memory card, an access badge, a driver's license, a passport, a state, regional, national or other identification card, and the like, which information directly and/or indirectly (e.g., through a referenced database) provides access to such image. Alternately and/or additionally, a photo of a traveler, event participant, item purchaser, and the like, may be taken during a transaction by, for example, a camera 1190 associated with a transaction computer or terminal such as a travel ticket kiosk 1100, which image may then be printed on a related document such as a boarding pass 400, ticket, receipt, and the like, during execution of the transaction by a printer, such as a two-sided printer 100, associated with the computer or terminal.

For example, in one embodiment, a party to and/or associated with a transaction, such as a traveler associated with the purchase and/or issuance of a multi-lingual two-sided boarding pass 400, may scan an identification document (e.g., a driver's license, a passport, a state, regional and/or national ID, and the like) through a reader 1180 associated with a travel ticket kiosk 1100. Such reader 1180 may, then, extract information stored on or in the identification document (e.g., on or in one or more magnetic stripes, memory chips, bar codes, alphanumeric passages, and the like, associated with the ID), which information may directly and/or indirectly (e.g., through exchange with one or more local and/or remote datastores such as a government passport database) provide information comprising an image of the traveler, which information may then be used by an associated computer or terminal, such as a travel ticket kiosk 1100, to print the image of the traveler on one or both sides of a two-sided document such as a multi-lingual two-sided boarding pass 400.

As described hereinabove, selection of a first and/or a second language, a first and/or a second currency unit, a first and/or a second bar code symbology, and the like, for printing of one or both sides of a two-sided document such as, but not limited to, a multi-lingual two-sided receipt 200, 300 and/or a multi-lingual two-sided boarding pass 400, may be made based on one or more aspects of a related transaction including, but not limited to: (i) a location associated with the transaction, (ii) a type and/or characteristic of a party to and/or associated with the transaction, (iii) a type of document issued and/or utilized as part of the transaction, (iv) an object of the transaction, (v) an applicable law and/or regulation governing and/or applying to the transaction, and the like.

FIG. 5 illustrates a first method of printing of a first and a second side of a two-sided document, such as, but not limited to, a multi-lingual two-sided receipt 200, 300 as shown in FIGS. 2A and 2B, and 3A and 3B, and/or a multi-lingual two-sided boarding pass 400 as shown in FIGS. 4A and 4B.

At step 510 of the method 500 of FIG. 5 a transaction is initiated. Depending on the embodiment, such transaction may comprise, but is not limited to, one or more of a travel, shipping, entertainment, dining, banking, purchase, lease, loan, and like transaction resulting in and/or including issuance of one or more documents such as, but not limited to, one or more of a boarding, shipping, ticket, voucher, statement, receipt, agreement, label, and like document. Further, and depending on the embodiment, such transaction may be initiated on or through use of one or more computers or terminals such as, but not limited to, a POS terminal 1000, an automated teller machine (ATM) (not shown), a self-checkout system (not shown), a hotel kiosk (not shown), a travel ticket kiosk 1100, a personal computer (not shown), and the like, via manual and/or automated (e.g., scanning, reading, and the like) entry of information, such as information from one or more of items associated with a party to the transaction such as, but not limited to, one or more of a bank card, a credit card, a debit card, a loyalty card, a membership card, a key card, a smart card, a memory card, an access badge, a driver's license, a passport, a state, regional, national or other identification card, and the like.

At step 520, information relating to the transaction is generated. Depending on the embodiment, such information may comprise, but is not limited to, one or more of travel (e.g., origin, destination, traveler(s), carrier, date, time, gate, and the like), shipping (e.g., origin, destination, contents, carrier, date, time, and the like), entertainment (e.g., event, attendee(s), location, date, time, and the like), dining (e.g., establishment, attendee(s), location, date, time, and the like), banking (e.g., bank, account, debit, credit, date, time, and the like), purchase (e.g., goods and/or services, establishment, date, time, purchaser, and the like), lease (e.g., lessor, lessee, duration, residual value, payment terms, and the like), loan (e.g., lendor, borrower, duration, rate, down payment, collateral, payment terms, and the like), and like information, as well as economic (e.g., cost and/or price) information associated with any of the above. Further, and depending on the transaction, such information may be generated automatically and/or through interaction with one or more parties involved in, and/or related to, the transaction, including interaction with one or more items (e.g., a bank card, a credit card, a debit card, a loyalty card, a membership card, a key card, a smart card, a memory card, an access badge, a driver's license, a passport, a state, regional, national or other identification card, and like documents, cards, or other information carrying and/or exchange means) associated with a party.

At step 530, a first and a second language for printing of some or all of the generated transaction information on a respective first and/or second side of a document are identified based on one or more aspects of the transaction. As disclosed hereinabove, the one or more aspects of the transaction may comprise one or more of: (i) a location associated with the transaction, (ii) a type and/or characteristic of a party to and/or associated with the transaction, (iii) a type of document issued and/or utilized as part of the transaction, (iv) an object of the transaction, (v) an applicable law and/or regulation governing and/or applying to the transaction, and the like. Likewise, and as disclosed hereinabove, the one or more aspects of the transaction may be obtained from a computer and/or terminal at or through which the transaction is performed, and/or through interaction with one or more parties involved in and/or related to the transaction, including interaction with one or more items associated with a party.

In one embodiment, a first language may comprise a language associated with a location (e.g., a country) of a computer or terminal (e.g., a POS terminal 1000) on or through which some or all of the transaction is performed, and a second language may comprise a language in which a party to the transaction (e.g., a purchaser) prefers to communicate.

Subsequently, at step 540, some or all of the generated transaction information is printed on a first side of a multi-lingual two-sided document in the identified first language, while, at step 550, some or all of the generated transaction information is printed on a second side of the multi-lingual two-sided document in the identified second language.

It should be noted that, in some embodiments, it may be necessary to translate some or all of the generated transaction information from one or more languages in which it is generated or otherwise available (e.g., a first language) to one or more languages (e.g., a second language) in which it is desired or required to be printed, as illustrated in respect to FIG. 6.

FIG. 6 illustrates a second method of printing of a first and a second side of a two-sided document, such as, but not limited to, a multi-lingual two-sided receipt 200, 300 as shown in FIGS. 2A and 2B, and 3A and 3B, and/or a multi-lingual two-sided boarding pass 400 as shown in FIGS. 4A and 4B.

At step 610 of the method 600 of FIG. 6 a transaction is initiated. As described hereinabove, such transaction may comprise one or more of a travel, shipping, entertainment, dining, banking, purchase, lease, loan, and like transaction resulting in and/or including issuance of one or more documents such as, but not limited to, one or more of a boarding, shipping, ticket, voucher, statement, receipt, agreement, label, and the like document.

At step 620, information relating to the transaction is generated. Depending on the embodiment, such information may comprise, but is not limited to, one or more of travel (e.g., origin, destination, traveler(s), carrier, date, time, gate, and the like), shipping (e.g., origin, destination, contents, carrier, date, time, and the like), entertainment (e.g., event, attendee(s), location, date, time, and the like), dining (e.g., establishment, attendee(s), location, date, time, and the like), banking (e.g., bank, account, debit, credit, date, time, and the like), purchase (e.g., goods and/or services, establishment, date, time, purchaser, and the like), lease (e.g., lessor, lessee, duration, residual value, payment terms, and the like), loan (e.g., lendor, borrower, duration, rate, down payment, collateral, payment terms, and the like), and like information, as well as economic (e.g., cost and/or price) information associated with any of the above. Further, and depending on the transaction, such information may be generated automatically and/or through interaction with one or more parties involved in, and/or related to, the transaction, including interaction with one or more items (e.g., a bank card, a credit card, a debit card, a loyalty card, a membership card, a key card, a smart card, a memory card, an access badge, a driver's license, a passport, a state, regional, national or other identification card, and like documents, cards, or other information carrying and/or exchange means) associated with a party.

At step 630, a first and a second language for printing of some or all of the generated transaction information on a respective first and/or second side of a document are identified based on one or more aspects of the transaction. As disclosed hereinabove, the one or more aspects of the transaction may comprise one or more of: (i) a location associated with the transaction, (ii) a type and/or characteristic of a party to and/or associated with the transaction, (iii) a type of document issued and/or utilized as part of the transaction, (iv) an object of the transaction, (v) an applicable law and/or regulation governing and/or applying to the transaction, and the like. Likewise, and as disclosed hereinabove, the one or more aspects of the transaction may be obtained from a computer and/or terminal at or through which the transaction is performed, and/or through interaction with one or more parties involved in and/or related to the transaction, including interaction with one or more items associated with a party.

In one embodiment, a first language may comprise a language in which application and/or operating system software 1126, 1128 executing on a terminal (e.g., a travel ticket kiosk 1100) at or through which some or all of a transaction is performed is set to operate, and a second language may comprise a language used at a (secondary) location associated with the transaction (e.g., a travel destination).

At step 640, some or all of the generated transaction information is translated from the language in which it is generated to the first and/or second language. Depending on the embodiment, such translation may occur local to a terminal at or through which some or all of a transaction is performed, and/or through use of one or more remote servers in communication therewith.

In reference to the multi-lingual two-sided boarding pass 400 of FIGS. 4A and 4B, in one embodiment, transaction information is translated from a first language comprising a language in which the transaction information is generated (e.g., English) to a second language comprising a language (e.g., French) used at a location (e.g., Quebec) associated with the transaction.

At step 650, some or all of the generated transaction information is printed on the first side of the multi-lingual two-sided document in the first language, while, at step 650, the some or all of the translated transaction information is printed on the second side of the multi-lingual two-sided document in the second language.

In one embodiment, simultaneous printing of a first side and a second side of a document in the form of a multi-lingual two-sided boarding pass 400 may occur through use of a two-sided printer 100, such as a two-sided direct thermal printer, associated with, for example, a travel ticket kiosk 1100.

It some embodiments, an identified first and second language may be the same, or substantially similar, such as, for example, where an English speaking U.S. national purchases good and/or services at a retail establishment in Boston, Mass. or London, England. In such circumstance, rather than print repetitive information in the same or a similar language or dialect on a second side of a two-sided document, it may be desired to use the available space for printing of additional information thereon, and/or for minimizing media 102 use through printing of a first portion of transaction information on a first side of the document and a second portion of the transaction information on the second side of the document, as illustrated and further described in respect to FIGS. 7 and 8.

FIG. 7 illustrates a third method of printing of a first and a second side of a two-sided document, such as, but not limited to, a multi-lingual two-sided receipt 200, 300 as shown in FIGS. 2A and 2B, and 3A and 3B, and/or a multi-lingual two-sided boarding pass 400 as shown in FIGS. 4A and 4B.

At step 710 of the method 700 of FIG. 7 a transaction is initiated. As described hereinabove, such transaction may comprise one or more of a travel, shipping, entertainment, dining, banking, purchase, lease, loan, and like transaction resulting in and/or including issuance of one or more documents such as, but not limited to, one or more of a boarding, shipping, ticket, voucher, statement, receipt, agreement, label, and the like document.

At step 720, information relating to the transaction is generated. Depending on the embodiment, such information may comprise, but is not limited to, one or more of travel (e.g., origin, destination, traveler(s), carrier, date, time, gate, and the like), shipping (e.g., origin, destination, contents, carrier, date, time, and the like), entertainment (e.g., event, attendee(s), location, date, time, and the like), dining (e.g., establishment, attendee(s), location, date, time, and the like), banking (e.g., bank, account, debit, credit, date, time, and the like), purchase (e.g., goods and/or services, establishment, date, time, purchaser, and the like), lease (e.g., lessor, lessee, duration, residual value, payment terms, and the like), loan (e.g., lendor, borrower, duration, rate, down payment, collateral, payment terms, and the like), and like information, as well as economic (e.g., cost and/or price) information associated with any of the above. Further, and depending on the transaction, such information may be generated automatically and/or through interaction with one or more parties involved in, and/or related to, the transaction, including interaction with one or more items (e.g., a bank card, a credit card, a debit card, a loyalty card, a membership card, a key card, a smart card, a memory card, an access badge, a driver's license, a passport, a state, regional, national or other identification card, and like documents, cards, or other information carrying and/or exchange means) associated with a party.

At step 730, a first and a second language for printing of some or all of the generated transaction information on a respective first and/or second side of a document are identified based on one or more aspects of the transaction. As disclosed hereinabove, the one or more aspects of the transaction may comprise one or more of: (i) a location associated with the transaction, (ii) a type and/or characteristic of a party to and/or associated with the transaction, (iii) a type of document issued and/or utilized as part of the transaction, (iv) an object of the transaction, (v) an applicable law and/or regulation governing and/or applying to the transaction, and the like. Likewise, and as disclosed hereinabove, the one or more aspects of the transaction may be obtained from a computer and/or terminal at or through which the transaction is performed, and/or through interaction with one or more parties involved in and/or related to the transaction, including interaction with one or more items associated with a party.

In one example, a first language (e.g., English) may comprise a language corresponding to a location associated with an origin of a shipping transaction (e.g., Dayton, Ohio), and a second language (e.g., German) may comprise a language corresponding to a location associated with a destination of the shipping transaction (e.g., Stuttgart, Germany). In a further example, a first language (e.g., English) may comprise a language corresponding to a location associated with a first party to a retail transaction (e.g., a Massachusetts merchant), and a second language (e.g., English) may comprise a language corresponding to a second party to the retail transaction (e.g., a Connecticut purchaser).

Subsequently, as step 740, the first language is compared to the second language in order to determine, at step 750, if the first language is the same as or, in some embodiments, substantially similar to the second language.

Where the first language is not the same as nor, in some embodiments, substantially similar to the second language, at step 760, some or all of the generated transaction information may be printed on a first side of a two-sided document in the first language, and, at step 770, some or all of the generated transaction information may be printed on a second side of the two-sided document in the second language.

However, where the first language is the same as or, in some embodiments, substantially similar to the second language, at step 780, a first portion of the generated transaction information may be printed on the first side of the two-sided document in the first language, and, at step 790, a second portion of the generated transaction information may be printed on the second side of the two-sided document in the first language.

Figure 8:
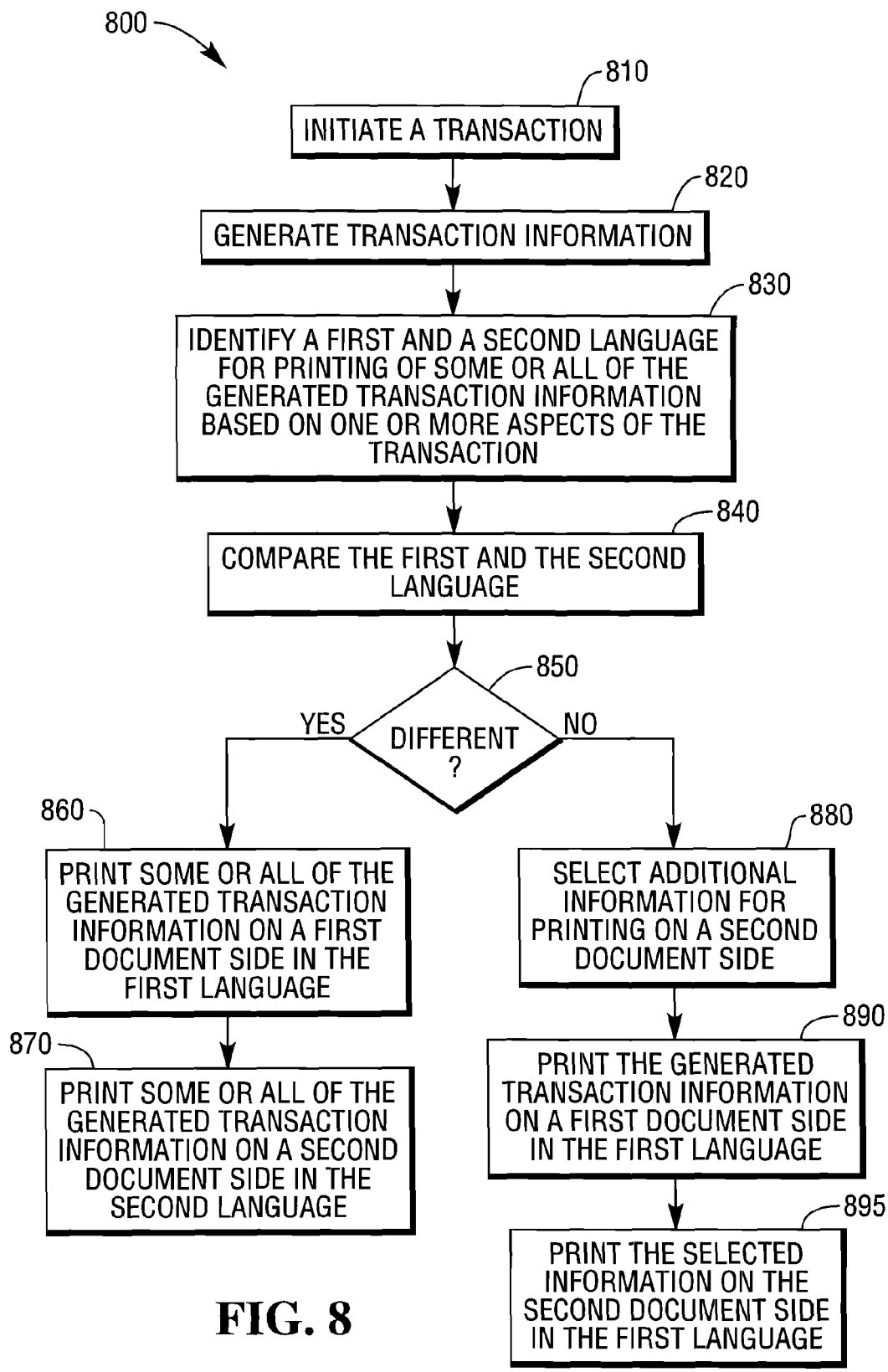
FIG. 8 illustrates a fourth method of printing of a first and a second side of a two-sided document.

FIG. 8 illustrates a fourth method of printing of a first and a second side of a two-sided document, such as, but not limited to, a multi-lingual two-sided receipt 200, 300 as shown in FIGS. 2A and 2B, and 3A and 3B, and/or a multi-lingual two-sided boarding pass 400 as shown in FIGS. 4A and 4B.

At step 810 of the method 800 of FIG. 8 a transaction is initiated. As described hereinabove, such transaction may comprise one or more of a travel, shipping, entertainment, dining, banking, purchase, lease, loan, and like transaction resulting in and/or including issuance of one or more documents such as, but not limited to, one or more of a boarding, shipping, ticket, voucher, statement, receipt, agreement, label, and the like document.

At step 820, information relating to the transaction is generated. Depending on the embodiment, such information may comprise, but is not limited to, one or more of travel (e.g., origin, destination, traveler(s), carrier, date, time, gate, and the like), shipping (e.g., origin, destination, contents, carrier, date, time, and the like), entertainment (e.g., event, attendee(s), location, date, time, and the like), dining (e.g., establishment, attendee(s), location, date, time, and the like), banking (e.g., bank, account, debit, credit, date, time, and the like), purchase (e.g., goods and/or services, establishment, date, time, purchaser, and the like), lease (e.g., lessor, lessee, duration, residual value, payment terms, and the like), loan (e.g., lendor, borrower, duration, rate, down payment, collateral, payment terms, and the like), and like information, as well as economic (e.g., cost and/or price) information associated with any of the above. Further, and depending on the transaction, such information may be generated automatically and/or through interaction with one or more parties involved in, and/or related to, the transaction, including interaction with one or more items (e.g., a bank card, a credit card, a debit card, a loyalty card, a membership card, a key card, a smart card, a memory card, an access badge, a driver's license, a passport, a state, regional, national or other identification card, and like documents, cards, or other information carrying and/or exchange means) associated with a party.

At step 830, a first and a second language for printing of some or all of the generated transaction information on a respective first and/or second side of a document are identified based on one or more aspects of the transaction. As disclosed hereinabove, the one or more aspects of the transaction may comprise one or more of: (i) a location associated with the transaction, (ii) a type and/or characteristic of a party to and/or associated with the transaction, (iii) a type of document issued and/or utilized as part of the transaction, (iv) an object of the transaction, (v) an applicable law and/or regulation governing and/or applying to the transaction, and the like. Likewise, and as disclosed hereinabove, the one or more aspects of the transaction may be obtained from a computer and/or terminal at or through which the transaction is performed, and/or through interaction with one or more parties involved in and/or related to the transaction, including interaction with one or more items associated with a party.

In one example, a first language (e.g., Spanish) may comprise a language corresponding to a location (e.g., Madrid, Spain) associated with self-service terminal (e.g., an ATM) employed for execution of a transaction (e.g., a cash withdrawal), and a second language (e.g., Italian) may comprise a language corresponding a party (e.g., a natural person having an Italian billing address) executing the transaction thereon. In a further example, a first language (e.g., English) may comprise a language associated with a party to a transaction (e.g., a U.S. resident), and a second language (e.g., Spanish) may correspond to a language such transaction information is required to be provided in secondary to English pursuant to an applicable (e.g., El Paso, Tex.) ordinance.

Subsequently, as step 840, the first language is compared to the second language in order to determine, at step 850, if the first language is the same as or, in some embodiments, substantially similar to the second language.

Where the first language is not the same as nor, in some embodiments, substantially similar to the second language, at step 860, some or all of the generated transaction information may be printed on a first side of the two-sided document in the first language, and, at step 870, some or all of the generated transaction information may be printed on a second side of the two-sided document in the second language.

However, where the first language is the same as or, in some embodiments, substantially similar to the second language, at step 880, additional information may be selected for printing on a second side of a two-sided document. As disclosed hereinabove, such additional information may comprise one or more of a coupon or other discount offer, a logo, a header, a serialized cartoon, a condition of sale, a graphic or other image such as a bar code, an advertisement, a security feature, rebate or contest information, legal information such as a disclaimer, a warranty, or a return policy, location (e.g., address, store, etc) information, contact information (e.g., phone number, URL, etc), and the like. Further, such additional information may be selected based on one or more aspects of the current transaction (e.g., a location associated with the transaction; a type and/or characteristic of a party to and/or associated with the transaction; a type of document issued and/or utilized as part of the transaction; an object of the transaction; an applicable law and/or regulation governing and/or applying to the transaction, and the like), prior transactions (e.g., purchase histories), and/or known party preferences (e.g., through one or more loyalty or other incentive programs).

At step 890, the generated transaction information may be printed on the first side of the two-sided document in the first language, and, at step 895, selected additional information may be printed on the second side of the two-sided document in the first language.

It should be noted that, in some embodiments, a first and a second portion of the generated transaction information may be printed on a respective first and second side of a two-sided document while selected additional information may be printed on either or both of the first and the second side of the two-sided document, where, when printed, the selected additional information may be the same or different among the first and the second sides.

Additionally, it should be noted that while printing of a front and a second side of a document are shown occurring in sequence in the methods 500, 600, 700, and 800 of FIGS. 5, 6, 7 and 8, printing of the first and second document sides in respective first and second languages, with respective first and second transaction information portions, and/or with select additional information (etc), may occur simultaneously or near-simultaneously through use of, for example, a two-sided printer 100.

Further, in various embodiments, transaction information may be provided on one or more first terminals and/or displays in a first language, currency unit, and the like, and on one or more second terminals and/or displays in a second language, currency unit, and the like, wherein the first and second language, currency unit, and the like are selected based on one or more transaction aspects. In one such embodiment, a POS terminal 1000 may be provided with a first display 1050 for viewing by an American POS operator/clerk, and a second display 1060 for viewing by a Spanish purchaser of goods and/or services, wherein the first display 1050 may present transaction information in a first language and/or currency (e.g., English and/or U.S. Dollars) to the POS operator and the second display 1060 may present transaction information in a second language and/or currency (e.g., Spanish and/or Euros) to the purchaser. Variations including embodiments wherein a two-sided document such as, but not limited to, a multi-lingual two-sided receipt 200, 300 as shown in FIGS. 2A and 2B, and 3A and 3B, and/or a multi-lingual two-sided boarding pass 400 as shown in FIGS. 4A and 4B, is printed by a two-sided printer 100 associated with the computer or terminal 1000, and/or wherein one or more of the first and second display languages differ from the respective first and second print languages, are also possible.

In some embodiments, information identified for printing on a first side of a two-sided document and/or in a first language may be printed using one means (e.g., direct thermal) while information identified for printing on a second side of the two-sided document and/or in a second language may be printed using a second means (e.g., thermal transfer or ink jet).

Depending on the embodiment, some or all of the above described methods 500, 600, 700, 800 may be implemented by or through use of one or more of a POS terminal 1000, an automated teller machine (ATM) (not shown), a self-checkout system (not shown), a hotel kiosk (not shown), a travel ticket kiosk 1100, a personal computer (not shown), and the like. Further, while a receipt 200, 300 has been described as being issued by a POS terminal 1000, and a ticket in the form of a boarding pass 400 has been described as being issued by a travel ticket kiosk 1100 as part of the performance of respective purchase and ticketing transactions, any or all of the above described terminals, systems, kiosks, computers, and the like, may be used to generate any two-sided document such as a multi-lingual two-sided document in the form of a multi-lingual two-sided receipt 200, 300, ticket/boarding pass 400, statement, voucher, directions, discount offer, purchase agreement, lease agreement, loan agreement, shipping document or label, and the like.

The above description is illustrative, and not restrictive. In particular, design and/or designation of a first and a second print head, platen, gear, and the like, as well as a first and second document sides, and the like, may vary among embodiments.

Further, many other embodiments will be apparent to those of skill in the art upon reviewing the above description. The scope of the embodiments should therefore be determined with reference to the appended claims, along with the full scope of equivalents to which such claims are entitled.

In the foregoing description of the embodiments, various features are grouped together in a single embodiment for the purpose of streamlining the disclosure. Likewise, various features are described only with respect to a single embodiment in order to avoid undue repetition. This method of disclosure is not to be interpreted as reflecting that the claimed embodiments should have more or less features than are expressly recited in each claim. Rather, the claims are hereby incorporated into the description of the embodiments, with each claim standing on its own as a separate exemplary embodiment.

What is claimed is:

1. A method of multi-lingual two-sided printing of two-sided media for a commercial transaction between a first party and a second party to provide a multi-lingual two-sided transaction document which can be provided to the first party, the method comprising:
   receiving first data which is associated with the first party to initiate the commercial transaction includes obtaining personal information from one or more items associated with a the first party to the commercial transaction;
   receiving second data which is associated with the second party who is different from the first party;
   processing the first and second data includes processing the obtained personal information to (i) identify the first language for printing at least some commercial transaction information on a first side of the two-sided media, wherein the first language comprises a language associated with the first party to the commercial transaction, and (ii) identify a second language different from the first language for printing at least some commercial transaction information on a second side of the two-sided media, wherein the second language comprises a language associated with a location where the commercial transaction is initiated;
   printing commercial transaction information on the first side of the two-sided media in the first language; and
   printing commercial transaction information on the second side of the two-sided media in the second language and thereby to provide the multi-lingual two-sided transaction document which can be provided to the first party.

2. The method of claim 1, wherein the one or more items comprise one or more of a bank card, a credit card, a debit card, a loyalty card, a membership card, a key card, a smart card, a memory card, an access badge, a memory card, and a government issued identification.

3. The method of claim 2, wherein the government issued identification comprises one or more of a driver's license, a passport, a state identification, a regional identification, and a national identification.

4. The method of claim 1, wherein the first language associated with the first party to the commercial transaction comprises a language associated with a nationality of the first party.

5. The method of claim 1, wherein printing commercial transaction information on the second side of the two-sided media in the second language comprises printing some or all of the commercial transaction information printed on the first side of the two-sided media in the first language on the second side of the two-sided media in the second language.

6. The method of claim 5, wherein: (i) processing the first and second data includes translating some or all of the commercial transaction information printed on the first side of the two-sided media from the first language to the second language; and (ii) printing commercial transaction information on the second side of the two-sided media in the second language includes printing the translated information on the second side of the two-sided media.

7. The method of claim 1, wherein the commercial transaction information printed on the first and the second side of the two-sided media comprises one or more of receipt, boarding, event, direction, statement of account, discount offer, purchase agreement, lease agreement, loan agreement, and shipping information.

8. The method of claim 7, wherein the commercial transaction information printed on the first side of the two-sided media in the first language comprises receipt information and the commercial transaction information printed on the second sided of the two-sided media in the second language comprises discount offer information.

9. The method of claim 8, wherein the discount offer information is selected based on the receipt information.

10. The method of claim 1, wherein printing commercial transaction information on the first side of the two-sided media in the first language occurs substantially simultaneous with printing commercial transaction information on the second side of the two-sided media in the second language.

11. The method of claim 1, wherein: (i) processing the first and second data includes identifying a first currency unit for printing on the first side of the two-sided media and a second currency unit for printing on the second side of the two-sided media; (ii) printing commercial transaction information on the first side of the two-sided media in the first language includes printing monetary information on the first side of the two-sided media in the first currency unit; and (iii) printing commercial transaction information on the second side of the two-sided media in the second language includes printing monetary information on the second side of the two-sided media in the second currency unit, wherein the first currency unit is different from the second currency unit.

12. The method of claim 11, wherein the second currency unit comprises a currency unit associated with a location where the commercial transaction is initiated.

13. The method of claim 12, wherein the first currency unit comprises a currency unit associated with the first party to the commercial transaction.

14. The method of claim 11, wherein printing monetary information on the second side of the two-sided media in the second currency unit comprises printing some or all of the monetary information printed on the first side of the two-sided media in the first currency unit on the second side of the two-sided media in the second currency unit.

15. The method of claim 14, wherein: (i) processing the first and second data includes converting some or all of the monetary information printed on the first side of the two-sided media from the first currency unit to the second currency unit; and (ii) printing monetary information on the second side of the two-sided media in the second currency unit includes printing the converted monetary information on the second side of the two-sided media.

16. An apparatus for multi-lingual two-sided printing of two-sided media for a commercial transaction between a first party and a second party to provide a multi-lingual two-sided transaction document which can be provided to the first party, the apparatus comprising:
  a computer adapted to (i) receive first data which is associated with the first party to initiate the commercial transaction includes obtaining personal information from one or more items associated with a the first party to the commercial transaction, (ii) receive second data which is associated with the second party, and (iii) process the first and second data to identify a first language for printing at least some commercial transaction information on a first side of the two-sided media wherein the first language comprises a language associated with the first party to the commercial transaction, and identify a second language different from the first language for printing at least some commercial transaction information on a second side of the two-sided media wherein the second language comprises a language associated with a location where the commercial transaction is initiated; and
  a two-sided printer having two-sided media and adapted to substantially simultaneously (i) print some or all of the commercial transaction information relating to the commercial transaction in a first language on a first side of the two-sided media, and (ii) print some or all of the commercial transaction information relating to the commercial transaction in a second language which is different from the first language on a second side of the two-sided media.

17. The apparatus of claim 16, wherein the second language is selected based on an operating language of the computer.

18. The apparatus of claim 17, further comprising: a scanner adapted to read information from one or more items, wherein the first language is selected based on the information read from the one or more items.

19. The apparatus of claim 18, wherein the one or more items comprise one or more of a bank card, a credit card, a debit card, a loyalty card, a membership card, a key card, a smart card, a memory card, an access card, and a government issued identification.

20. The apparatus of claim 19, wherein the government issued identification comprises one of a driver's license, a passport, a state identification, a regional identification, and a national identification.

21. The apparatus of claim 18, wherein (i) the personal information read from at least one of the one or more items comprises information relating to a nationality of a party to the transaction, and (ii) the second language is selected based on the nationality of the party.

22. The apparatus of claim 16, wherein (i) the commercial transaction information relating to the commercial transaction includes monetary information, and (ii) the two-sided printer is further adapted to print the monetary information on the first side of the two-sided media in a first currency unit and print some or all of the monetary information on the second side of the two-sided media in a second currency unit which is different from the first currency unit.

23. The apparatus of claim 22, wherein the second currency unit comprises a currency unit associated with a location of the computer.

24. The apparatus of claim 23, wherein the first currency unit comprises a currency unit associated with a party to the commercial transaction.

25. The apparatus of claim 24, wherein the second currency unit comprises a currency unit associated with a nationality of a party to the commercial transaction.

26. A method of multi-lingual two-sided printing of two-sided media for a purchase transaction between a merchant and a buyer of goods and/or services at a point-of-sale terminal (POS) to provide a multi-lingual two-sided purchase transaction receipt which can be provided to the buyer, the method comprising:
  receiving first data which relates to payment effected by the buyer for the purchase of the goods and/or services to initiate the commercial transaction includes obtaining personal information from one or more items associated with a the first party to the commercial transaction;
  receiving second data which relates to the goods and/or services sold by the merchant;
  processing the first and second data to (i) identify a first language for printing at least some purchase transaction information on a first side of the two-sided media wherein the first language comprises a language associated with the first party to the commercial transaction, and (ii) identify a second language different from the first language for printing at least some purchase transaction information on a second side of the two-sided media, wherein the second language comprises a language associated with a location where the commercial transaction is initiated;
  printing purchase transaction information on the first side of the two-sided media in the first language; and
  printing purchase transaction information on the second side of the two-sided media in the second language and thereby to provide the multi-lingual two-sided purchase transaction receipt which can be provided to the buyer.

27. The method of claim 26, wherein printing purchase transaction information on the second side of the two-sided media in the second language comprises printing some or all of the purchase transaction information printed on the first side of the two-sided media in the first language on the second side of the two-sided media in the second language.

28. The method of claim 27, wherein: (i) processing the first and second data includes translating some or all of the purchase transaction information printed on the first side of the two-sided media from the first language to the second language; and (ii) printing purchase transaction information on the second side of the two-sided media in the second language includes printing the translated information on the second side of the two-sided media.

* * * * *